United States Patent [19]
Doshi et al.

[11] Patent Number: 6,055,242
[45] Date of Patent: Apr. 25, 2000

[54] METHOD AND APPARATUS ENABLING SYNCHRONOUS TRANSFER MODE, VARIABLE LENGTH AND PACKET MODE ACCESS FOR MULTIPLE SERVICES OVER A BROADBAND COMMUNICATION NETWORK

[75] Inventors: Bharat Tarachand Doshi, Holmdel; Subrahmanyam Dravida, Freehold; George John Kustka, Marlboro; Peter D. Magill, Freehold, all of N.J.; Curtis A. Siller, Andover, Mass.; Kotikalapudi Sriram, Marlboro, N.J.

[73] Assignee: Lucent Technologies Inc., Murray Hill, N.J.

[21] Appl. No.: 08/812,469

[22] Filed: Mar. 6, 1997

Related U.S. Application Data

[60] Provisional application No. 60/013,758, Mar. 20, 1996.

[51] Int. Cl.[7] .............................. H04J 3/24; H04L 12/43
[52] U.S. Cl. ........................ 370/458; 370/468; 370/474; 370/490
[58] Field of Search ...................... 370/389, 395, 370/442, 443, 458, 459, 460, 461, 468, 508, 470, 471, 473, 474, 477, 485, 487, 489, 490

[56] References Cited

U.S. PATENT DOCUMENTS

| | | | |
|---|---|---|---|
| 5,164,938 | 11/1992 | Jurkevich et al. | 370/231 |
| 5,392,280 | 2/1995 | Zheng | 370/353 |
| 5,420,851 | 5/1995 | Seshadri et al. | 370/280 |
| 5,570,355 | 10/1996 | Dail et al. | 370/352 |
| 5,638,371 | 6/1997 | Raychaudhuri et al. | 370/347 |
| 5,648,958 | 7/1997 | Counterman | 370/458 |
| 5,654,969 | 8/1997 | Wilhelmsson | 370/460 |
| 5,673,259 | 9/1997 | Quick, Jr. | 370/342 |
| 5,684,791 | 11/1997 | Raychaudhuri et al. | 370/278 |
| 5,719,872 | 2/1998 | Dubberly et al. | 370/487 |

*Primary Examiner*—Chi H. Pham
*Assistant Examiner*—Kwang B. Yao

[57] ABSTRACT

The specification relates to a broadband multiple access protocol for bi-directional hybrid fiber/coax (HFC) networks. The protocol supports downstream broadcast transmission from headend to cable modem, and also provides for allocation of bandwidth for cable modems to transmit back to the headend. Although the present invention is described in relation to an HFC network, it is also equally applicable to a wireless communications environment. The protocol supports different access modes such as synchronous transfer mode, asynchronous transfer mode, and variable length data. The protocol adapts to changing demands for a mix of circuit and packet mode applications and allocates upstream and downstream bandwidth in response to the a variety of bursty and isochronous traffic sources. In order to satisfy the quality of service requirements of varied applications, while maintaining high bandwidth efficiency, the protocol utilizes a frame structure with frame partitioning into regions; one region dedicated to STM payload and asynchronous, second region dedicated to ATM and VL payloads, messaging and control.

53 Claims, 13 Drawing Sheets

METHOD AND APPARATUS ENABLING SYNCHRONOUS TRANSFER MODE, VARIABLE LENGTH AND PACKET MODE ACCESS FOR MULTIPLE SERVICES OVER A BROADBAND COMMUNICATION NETWORK

CROSS REFERENCES TO RELATED APPLICATIONS

This application claims the benefit of U.S. Provisional Application Ser. No. 60/013,758, filed on Mar. 20, 1996.

FIELD OF THE INVENTION

This invention relates generally to digital communications and multimedia information transfer via a high bandwidth, bi-directional communications medium, and, in particular, to an access protocol and arrangement for competing stations connected via a hybrid fiber/coax network to a common headend. The invention also relates to cellular wireless networks, which are akin to fiber/coax networks, in that mobile stations do not usually directly communicate to each other, but instead depend on a base station for feedback.

BACKGROUND OF THE INVENTION

Broadband hybrid-fiber/coax (HFC) networks provide a flexible, cost-effective platform for offering a wide range of telecommunications services to residences and businesses. One of these services, high-speed multimedia access, is a particularly attractive opportunity for HFC network operators. Some of the envisioned applications include Internet access, the ability to communicate with the office while working at home, voice and video telephony, interactive game playing, etc.

Although there is substantial near-term demand for basic high-speed data access over HFC networks, it is uncertain how interactive data services will evolve over time. There is a strong trend towards the integration of data and non-data services within end-user applications. Highly compelling applications such as 'audio plus data,' 'voice plus data,' and 'audio plus video plus data,' for personal computers and other devices, are all under development. Wide-area network transport infrastructures are migrating towards asynchronous transfer mode (ATM) as bandwidth and quality-of-service (QOS) issues become critical for supporting these applications.

HFC pure data systems installed in the near-term must be gracefully upgradable to support these new integrated applications since it is unreasonable to require wholesale replacement of less flexible early generation equipment that has been optimized for a restricted class of data-centric applications, e.g., those requiring only transport of Ethernet frames or IP packets. Although it may be technically possible to add limited inefficient support for other traffic types to these early systems through "extensions," it is preferable to develop a flexible basic transport structure in place from the outset to provide for future evolution as warranted by the customer needs and business considerations. Such a transport system must be capable of transporting synchronous transfer mode (STM) information, such as voice and video telephony; variable length (VL) information, such as Internet Protocol (IP) or IEEE 802.3 frames; and asynchronous transfer mode (ATM) cells.

SUMMARY OF THE INVENTION

The present invention is a method and apparatus utilizing a broadband link protocol (BLP) that supports the delivery of a wide variety of interactive and noninteractive digital services over HFC networks. Advantageously, the present invention is capable of efficiently transporting synchronous transfer mode (STM) information, variable length (VL) information, and asynchronous transfer mode (ATM) cells. A network operator can determine, for each downstream channel, a mix of traffic types and the relative proportion of digital bandwidth allocated to each traffic type. The allocation of bandwidth to various traffic types can be accomplished at any time without affecting any of the installed end-user premises equipment.

Additionally, the BLP is constructed within a masterframe/frame/subframe hierarchy so as to allow coordination and synchronization of downstream broadcasts with multiple access upstream channels, low jitter characteristics, and minimal delay characteristics. In both downstream (broadcast) and upstream (multiple shared access) transmission, a variable quantity of time slots are allocated for STM channels based on volume of synchronous traffic. One STM time slot is allocated in each downstream subframe for each DS0 voice channel to achieve a required bit rate of 64,000 bits per second. The boundary between the STM transmission region and the asynchronous region is dynamic, so that changes in the volume of one type of information are reflected by the total bandwidth allocation for that type of information.

Although the present invention is particularly well suited for bi-directional hybrid fiber/coax (HFC) networks with tree and branch topologies, it is also equally applicable to cellular wireless networks, which are akin to fiber/coax networks, in that mobile stations do not usually directly listen to each other, but instead depend on a base station for feedback. Further, the present invention is also applicable to one-way HFC networks, wherein cable transport is only in the downstream (broadcast) direction, without provision for upstream bursts from cable modems to the headend.

BRIEF DESCRIPTION OF THE DRAWINGS

A more complete understanding of the present invention may be obtained from consideration of the following description in conjunction with the drawings in which.

DETAILED DESCRIPTION

The present invention encompasses a system utilizing a broadband link protocol (BLP) which specifies physical (PHY) and medium-access control (MAC) layers over a broadband communication network. A variety of traffic types can be time division multiplexed and modulated for integrated transport within a single radio frequency (RF) channel, or if desired, may be segregated onto separate RF channels, subject to spectrum allocation and administration by a headend (HE) bandwidth manager. These traffic types include synchronous transfer mode (STM) service data units, asynchronous transfer mode (ATM) service data units, and variable length (VL) service data units.

Although the present invention is particularly well suited for bi-directional hybrid fiber/coax (BFC) networks with tree and branch topologies, and shall be so described with respect to this application, the present invention also relates to wireless networks, which are akin to fiber/coax networks, in that mobile stations do not usually directly listen to each other, but instead depend on a base station for feedback. Therefore, since one embodiment of the present invention is described in the context of a "headend" and a "cable modem," it is understood that the present invention may also function in the context of their wireless network counterparts. For example, a "headend" may be replaced with a "common controller," and "cable modems" may be replaced with "mobile stations" or simply "stations." Further, the present invention is also applicable to one-way HFC networks, wherein cable transport is only in the downstream (broadcast) direction, without provision for upstream bursts from cable modems to the headend.

FIGS. 1 through 17, and the accompanying detailed description contained herein, are to be used as an illustrative example of a preferred embodiment of the present invention, and should not be construed as the only manner of practicing the present invention. Numerous modifications and alternative embodiments of the invention will be apparent to those skilled in the art in view of the following description. Details of the structure may be varied substantially without departing from the spirit of the invention.

Figure 1:
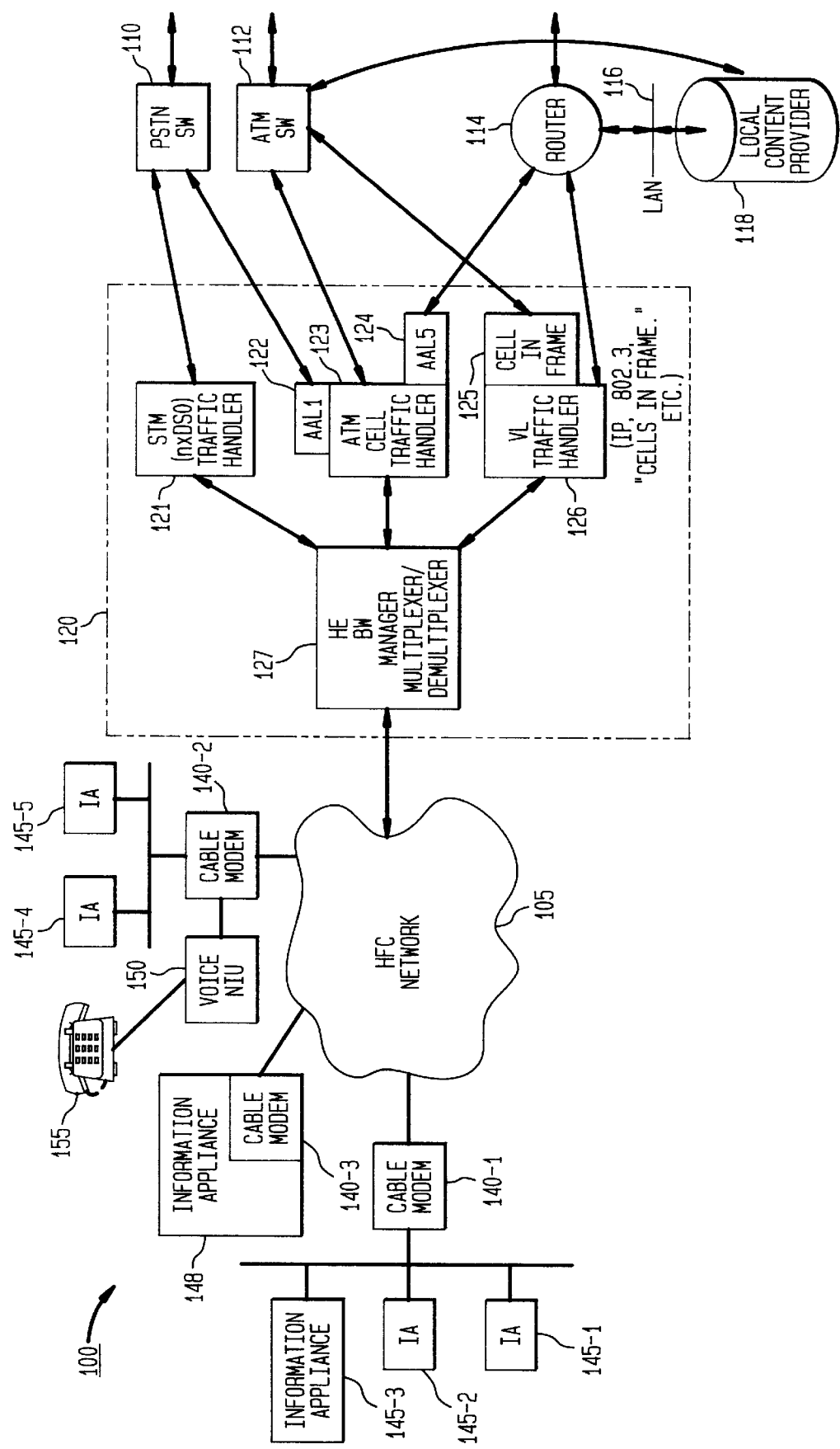
FIG. 1 illustrates an exemplary arrangement of a broadband hybrid fiber/coax network utilized in accordance with the present invention, the network connecting a headend to a plurality of cable modems for downstream signal broadcasting and allowing upstream information transmission from the individual cable modems back to the headend as well.

FIG. 1 illustrates an exemplary system operator's network 100 with which the present invention may be used. An HFC network 105 is comprised of coaxial cable with tree and branch topology, point-to-point optical fiber, or a combination of both and is characterized by a wide bandwidth. Typically, a 54–750 Megahertz (MHz) band is utilized for downstream (broadcast) cable television (CATV) frequency bands, and the frequencies between 5–42 MHz are reserved for upstream communications. The HFC 105 allows the system operator to connect cable modems to the end users. A headend (HE) 127 is maintained at the system operator's premises 120. The HE 127 performs certain core functions, including transmission to and reception from the HFC network 105, bandwidth management for upstream and downstream communications and data transfer, as well as signal multiplexing and demultiplexing.

For example, a public switched telephone network (PSTN) 110 as shown in FIG. 1 is linked to the HE 127 through a synchronous transfer mode (STM) traffic handler 121. The STM traffic handler 121 is then linked with the HE 127. Also, the PSTN 110 can route traffic through an ATM adaptation layer (AAL) 122. By so doing, The AAL 122 converts non-ATM bit streams into ATM cells, which are then processed by the ATM cell traffic handler 123 before again being passed to the HE 127 for downstream delivery over the HFC network 105.

ATM traffic enters the system operator's premises 120 from an asynchronous transfer mode switch (ATM SW) 112, which delivers ATM cells to the ATM cell traffic handler 123. In turn, the ATM cell traffic handler 123 communicates with the HE 127, which then transmits those cell packets onto the HFC network 105. The ATM SW 12 can alternatively deliver ATM packets to a variable length (VL) traffic handler 126 after first converting those packets into proper VL form. This conversion takes place at the cell in the frame processor 125 located at the system operator's premises 120. The VL traffic handler then forwards the data to the HE 127 for ultimate transmission over the HFC network 105.

A local content provider 118 is shown providing input to the system operator's premises 120 for ultimate dissemination over the HFC network 105. The local content provider 118 is connected to a local area network (LAN) 116. The LAN 116, in turn, is connected to a router 114, which provides the necessary interface for data from the LAN 116. The router 114 may send the data directly to the VL traffic handler 126 or, if so directed, may send data through a ATM adaptation layer (AAL) 124. The AAL 124 converts non-ATM bit streams into ATM cells, which are then processed by the ATM cell traffic handler 123 before being passed to the HE 127 for downstream delivery. Data passed to the VL traffic handler 126 doesn't require such a conversion and is passed to the HE 127 directly for downstream delivery. Router 114 is also connected to an Internet Protocol (IP) type network (e.g.—Internet or Corporate Intranet). In this sense, an HFC provides access to this wide area data network Data units (e.g.—IP datagrams) arrive at Router 114 from the external network and are processed as are those arriving from the local content provider 118.

Communications and data broadcasted over the HFC network are ultimately available at cable modems 140-1, 140-2 and 140-3. The cable modem 140 converts the incoming data and communications into information usable by the information appliances 145. An information appliance 145 can be a computer terminal, a phone 155, or some other processing or communication device. A cable modem 140-3 may be incorporated into the information appliance 148 itself. Additionally, a cable modem may be used to provide telephony or video by utilizing a network interface unit M between the cable modem and the information appliance. For example, cable modem 140-2 is connected to a voice NIU 150, which provides the necessary continuity and conversion for use with a phone 155.

As previously stated, bandwidth is allocated upstream as well as downstream, so that information appliances can communicate with the HE 127. In the case of upstream transmission the sequence of processes and components described above are simply reversed. The processes performed by the HE 127 for downstream transmission are performed by the individual cable modems 140 for upstream transmission.

Figure 2:
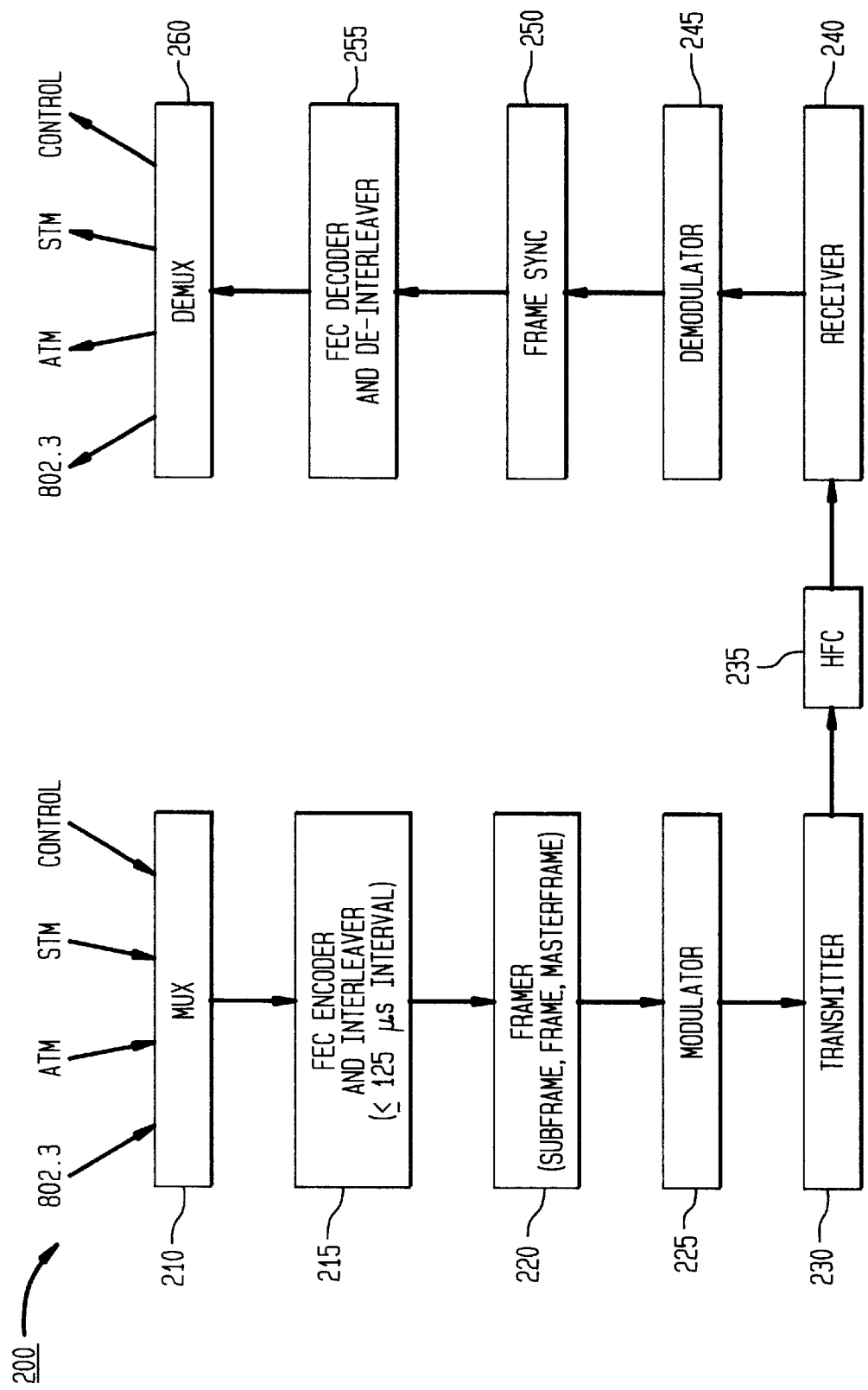
FIG. 2 is a block diagram illustrating exemplary functional components utilized for downstream transmission.

FIG. 2 represents a serialized downstream transmission system 200 using the present invention. At a higher level, queues are maintained for periodically arriving STM bytes, for STM signaling bits, for fixed length ATM cells, for VL service data units (which may be of various types, including internet protocol {IP}, internet packet exchange {IPX}, IEEE standard 802.3 {802.3}, or other variable length protocol data units {PDU}), and for control messages to be carried as variable length PDUs. The queued information is sent to a multiplexer 210, multiplexed within a subframe and then sent to a forward error correction (FEC) encoder and interleaver 215. The present invention utilizes a Reed Solomon coding scheme for forward error correction, although other methods of FEC may also be used, as would be apparent to those skilled in the art. The output of the FEC coder 215 is then prefixed with a framing byte at the framer 220, passed through a modulator 225 and broadcast over the hybrid fiber/coax network 235 via a transmitter 230.

The broadcasted signal is available to each cable modem receiver 240 tuned to this downstream channel. After passing through a demodulator 245, the framing byte identifies the boundary of a subframe. The payload subframe boundary is determined by a frame synchronizer 250 by analyzing the included firing byte. The framing byte is then removed and the payload is passed through the FEC decoder/deinterleaver combination 255. The subframe payload is then available to a demultiplexer 260 at the cable modem. The various payload components are separated and processed, as will be described later in greater detail.

As previously stated, bandwidth is allocated upstream as well as downstream. However, upstream bandwidth is used based on a multiple access protocol as opposed to broadcasted protocol used in the downstream direction. This requires a burst operation from each cable modem (CM) for upstream communications. Transmission from various CMs are synchronized to generate a continuous stream at the headend (HE). The upstream multiple access protocol will be described later in this application with greater detail.

Figure 3:
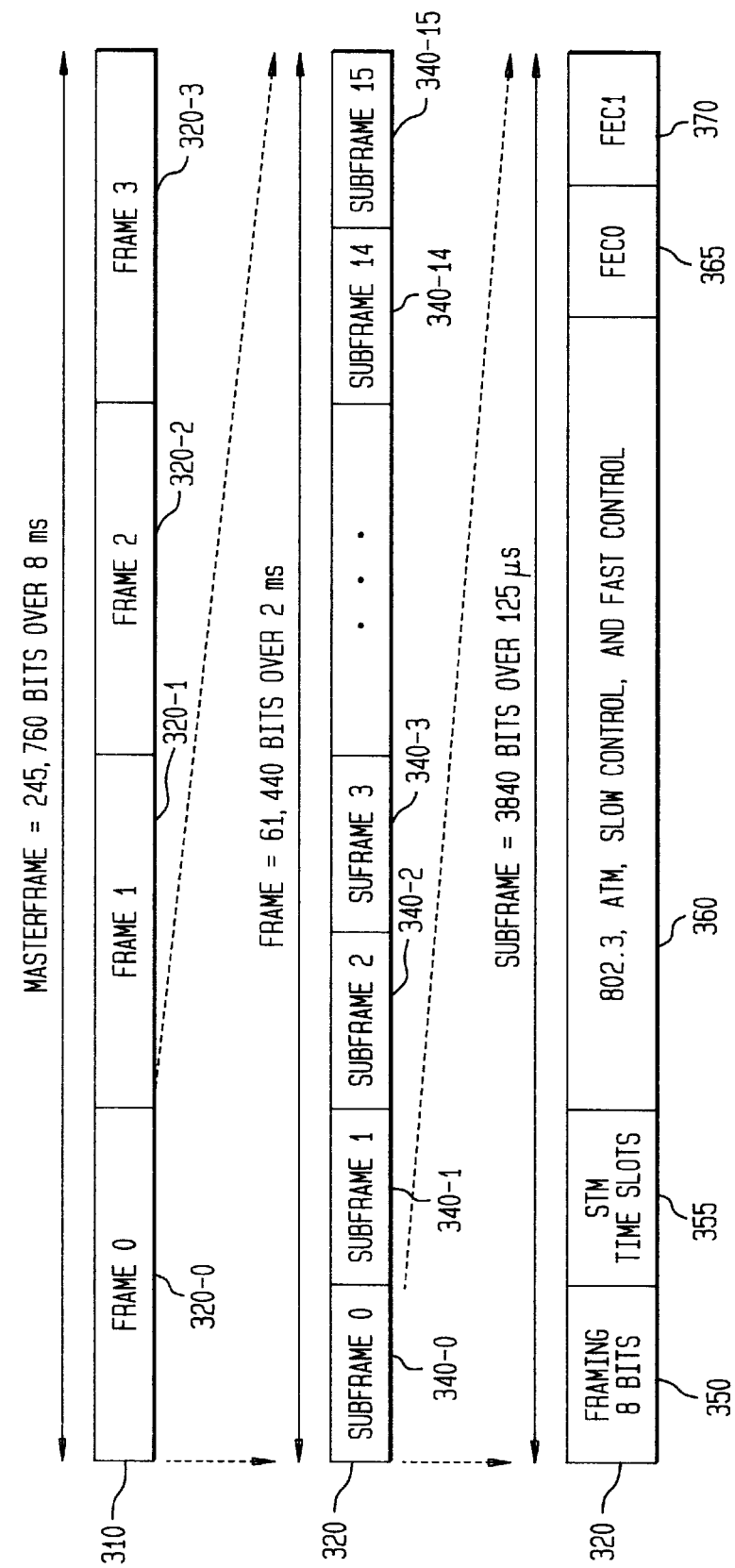
FIG. 3 illustrates an exemplary structure of downstream transmission and its division into master frame, frame, and subframe in accordance with the present invention.

Referring to FIG. 3, the details of an exemplary downstream frame construction and subdivision are illustrated.

The following description of one embodiment of the present invention precisely defines many specific values, components, and functions so as to completely illustrate the present invention. Various modifications can be made to the present invention, as would be apparent to those skilled in the art, including but not limited to specific values corresponding to master frame, frame, and subframe timing and construct, type of modulation/demodulation employed, and bandwidth allocated for downstream and upstream transmission. For the remainder of the description of this embodiment of the present invention, downstream transmission frequency is assumed to be 5.12 megahertz (MHz) and the method of downstream modulation elected is 64 quadrature amplitude modulation (64 QAM). These elections result in a raw bit transfer rate of 30.72 million bits per second (Mbps). Accordingly, the specific length of masterframes, frames and subframes, as well as the quantity of each within the transmission structure, are dependent on the elections made and will necessarily change if different bandwidths or modes of modulation are chosen.

A multiplexer at the headend utilizes a subframe, frame and masterframe structure to broadcast downstream efficiently and concurrently maintain quality of service (QOS) requirements. The basic downstream frame structure consists of a masterframe 310 composed of four frames 320-0 to 320-3. Each frame 320 in turn consists of 16 subframes 340-0 to 340-15. A masterfame 310 is designated as 8 milliseconds (ms) or 245,760 bits long. Since there are four frames 320-0 to 320-3 within a masterframe 310, each frame 320 is 2 ms or 61,440 bits long. Since each frame 320 contains sixteen subframes 340-0 to 340-15, each subframe 340 is exactly 125 microseconds ($\mu$s) or 3840 bits long.

Each subframe 340 consists of four major subdivisions. First, eight bits are dedicated as a framing byte 350. Time slots 355 are also allocated and apportioned as needed for synchronous transfer mode (STM) information. Another subdivision 360 carries various ATM and VL information, as well as slow control and fast control field information. Finally, forward error correction (FEC) information is also provided with FEC0 365 and FEC1 370, each of which is four bytes long. As mentioned previously, a 125 $\mu$s subframe 340 is 3840 bits long, which corresponds to 480 bytes. Since each subframe consists of one framing byte and eight bytes dedicated to FEC, the remaining information carrying area is 471 bytes.

Figure 4:
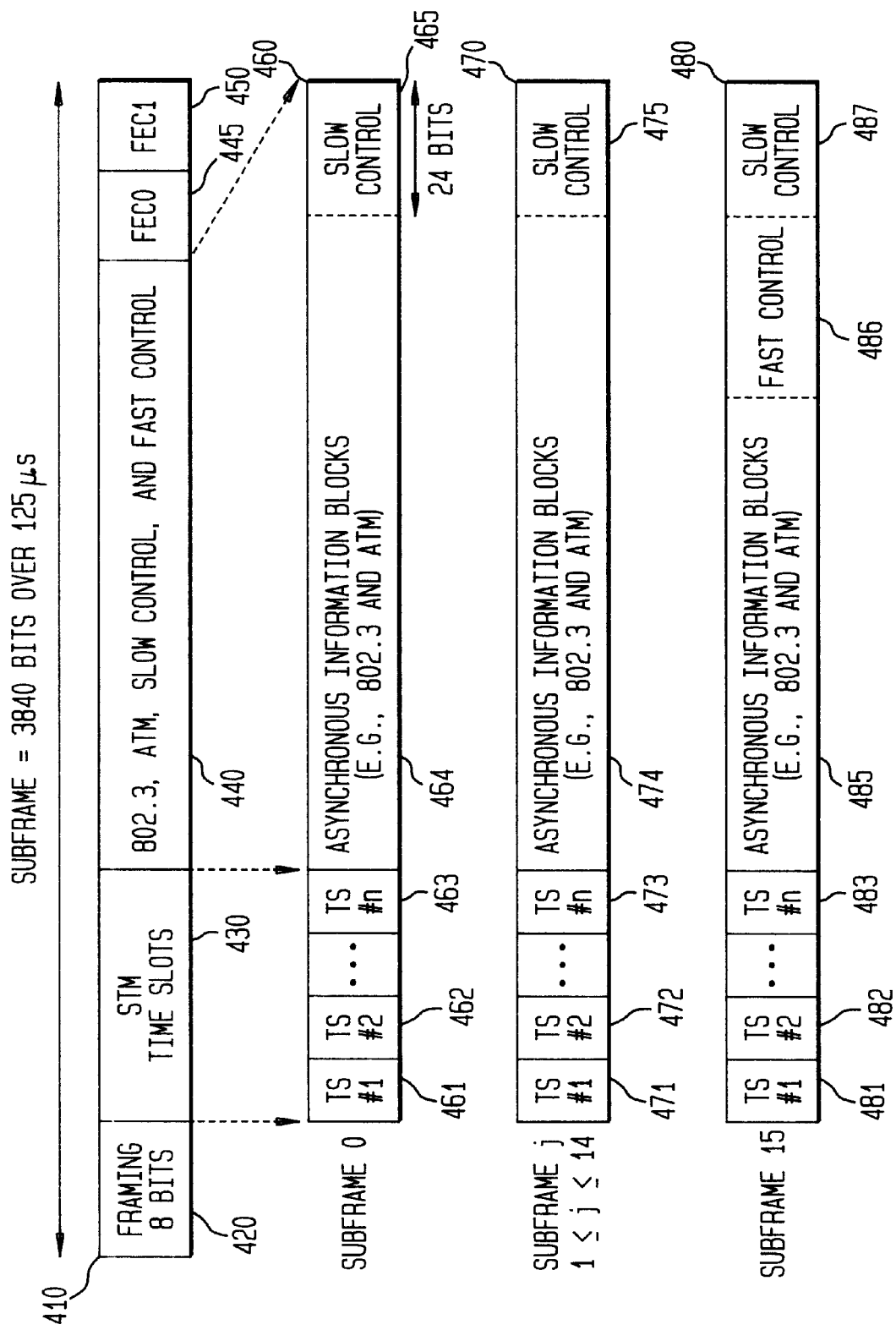
FIG. 4 illustrates an exemplary division of bytes between synchronous time slots, asynchronous blocks, framing bytes, and forward error correction in downstream subframes.

FIG. 4 shows a subframe 410 in greater detail, illustrating the division of bytes between STM time slots 430, an asynchronous block 440 which carries ATM and VL (e.g.— 802.3 frame) payloads in addition to slow control and fast control field information, the framing byte 420, and forward error correction, FEC0 445 and FEC1 450. Stripping away the overhead of the framing byte 420 and the FEC bytes, each subframe is left with 471 bytes of information carrying area. Three subframes are illustrated in FIG. 4. Subframe zero 460 represents the payload carrying area of the first subframe within a frame. Subframe j 470 represents an intermediate subframe within a frame, neither the first nor the sixteenth frame. Subframe fifteen 480 represents the final (sixteenth) subframe within a frame. Subframe zero 460 and subframe j 470 are identically constructed, whereas subframe fifteen 480 contains an additional fast control field (FCF) 486.

A subframe contains a quantity of STM time slots 461, 462, and 463 dedicated to individual channels of synchronous, non-bursty information such as video or voice telephony. The number of time slots remains fixed for every subframe within a frame, but can vary from frame to frame, depending on demand and allocation at the HE bandwidth manager (BM) for downstream synchronous information. For example, subframe zero 460 has allocated space for time slot one 461, time slot two 462, up to time slot n 463. Subframe j 470 therefore also allocates space for time slot one 471, time slot two 472, an so on, up through time slot n 473. Subframe fifteen 480 also allocates space for time slot one 481, time slot two 482, and so on, up to time slot n 483. However, the subframes of the next frame are not constrained to maintain n individual STM time slots. Subsequent frames may contain any number of STM time slots within each subframe, including no time slots at all, as required and allocated by the bandwidth manager. Synchronous time slots are assigned to voice or video telephony connections at the time of connection and are reallocated when associated connections are terminated.

A typical example of data transmitted as STM information would be voice telephony. Such data transmission is characterized by its continuous, non-bursty flow of information. For instance, one voice channel (DS0) would typically require 64,000 bits per second of information exchange. The present invention, a broadband link protocol (BLP) with 125 µs subframes, transmits 8000 subframes per second in the downstream direction. Therefore, since each time slot 430 is one byte in length, a total of 64,000 bits per second is in fact transmitted, the required amount. Each time slot is therefore capable of supporting one voice telephonic conversation. Since voice information is transmitted one byte every 125 µs, the QOS requirements necessary to support STM communications are met. Delay and jitter are minimized to levels acceptable for synchronous, non-bursty data transmission. In addition to voice samples, in band signaling needs to be carried in the downstream STM region. For each sixteen slots for voice communications, one byte (one STM slot) is dedicated for in band signaling.

Each subframe contains an asynchronous information block for carrying ATM and VL information payloads. Subframe zero asynchronous information block 464 is the same size as subframe asynchronous information block 474. In fact, since the number of STM time slots within a subframe of a particular frame is fixed, and each subframe contains a fixed sized slow control field as well, the asynchronous information block space for subframe zero through subframe fourteen within a particular frame are each apportioned to the exact same size by the BM. Subframe fifteen 480, however, has a smaller sized asynchronous information block 485 than each of the other subframes within a particular frame because subframe fifteen 480 contains a fast control field (FCF) 486. The FCF 486 in subframe fifteen 480 is followed by a slow control field (SCF) 487.

Each downstream subframe also contains a slow control field (SCF). Referring again to FIG. 4, subframe zero 460 has a corresponding SCF 465, subframe j 470 has a corresponding SCF 475, and subframe fifteen has a corresponding SCF 487. The SCF carries short control messages to individual cable modems (CM). These messages are used for operation, administration, and maintenance of cable modems. Each SCF is allocated three bytes, therefore a total of forty-eight bytes per frame are available for SCF. A SCF control message may cross subframe, frame, and masterframe boundaries. In other words, the SCF from successive subframes are concatenated to form a bytestream for slow control messages.

The beginning of a subframe 410 is marked with an eight bit framing pattern 420. This byte of information allows the receiver demultiplexer to synchronize the subframe, frame, and masterframe boundaries. The leftmost 2 bits of the 8 bit pattern are designated '11.' The next two bits from the left are used to establish the frame identity from the four frames of a masterframe. The remaining four bits cycle through the consecutive bit patterns from '0000' to '1111', indicating the position of the subframe within a frame as a subframe sequence number. Synchronization of subframe, frame, and masterframe boundaries is accomplished by the receiver holding buffered data while attempting to identify and verify the repetition of the initial two bits of a framing byte 420 as '11' and concurrently monitoring the progression of the last four bits at intervals of 480 bytes.

Figure 5:
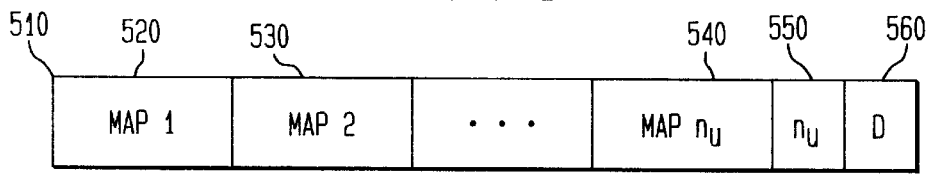
FIG. 5 is an exemplary illustration of the general construction of a fast control field utilized in accordance with the present invention.

FIG. 5 is a depiction of the downstream fast control field (FCF) 510. The purpose of the FCF is to control the basic operation of the present invention's physical (PHY) and medium access control (MAC) layers in real time. The FCF provides information about the downstream boundary between the STM region and the asynchronous information blocks, as well as upstream transmission information and control. The FCF maintains a separate forty-two byte MAP for each upstream channel associated with the downstream channel, six bits providing information about the number of upstream channels associated with the downstream channel, and a ten bit number describing the number of STM time slots currently allocated in the downstream channel.

The illustration in FIG. 5 depicts a total of $n_u$ upstream channels associated with this downstream channel. MAP1 520, MAP2 530, and MAP$n_u$ 540 are each forty-two byte fields, each associated with its respective upstream channel. The six bit variable $n_u$ 550 represents the number of upstream channels associated with this downstream channel. Finally, D 560 is a ten bit variable used as a downstream STM indication field. D 560 provides information about the boundary between the STM region and the asynchronous region in the downstream frame. It is readily seen that the size of the FCF 510 is variable and its total size can be described as two bytes plus the quantity 42 bytes times the number of upstream channels associated with the downstream channel. Further details describing the MAP field will be presented after upstream frame structure is described.

Figure 6:
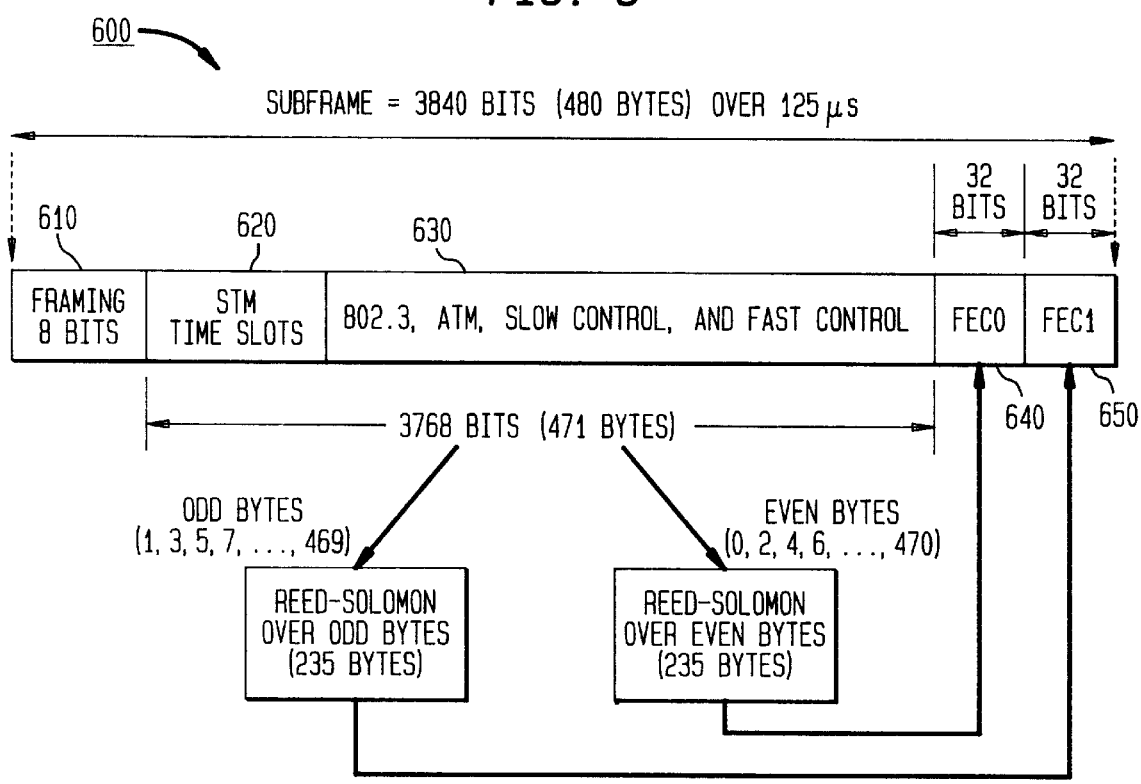
FIG. 6 illustrates an exemplary method for forward error correction and interleaving within subframe boundaries utilized in accordance with the present invention.

FIG. 6 illustrates an exemplary model for forward error correction (FEC) and interleaving 600. One subframe of 480 bytes is represented over 125 µs. As previously described, framing byte 610 is incorporated within each subframe. Also included in each subframe are eight bytes for forward error correction. This space is divided into two error correction blocks, FEC0 640 and FEC1 650, each 4 bytes long. Therefore 471 bytes remain for the payload itself, whether allocated within STM time slots 620, as asynchronous information and control 630, or a combination of both.

The present invention utilizes FEC for each subframe payload individually so that FEC blocks do not cross subframe boundaries. Arrangement of FEC within individual subframe boundaries allows for tight control of jitter. Each 471 byte payload subframe is divided into two FEC blocks of even and odd bytes. Each of these two blocks is Reed Solomon coded with four bytes of FEC overhead, thus creating 240 and 239 byte FEC coded payloads. The transmitter sends the subframe bytes in original order followed by the FEC bytes. Advantageously, the interleaving is performed through FEC blocks of odd and even bytes without changing the order of transmission of data payload bytes (STM and asynchronous data). This arrangement of byte-wise interleaving over a subframe allows delay sensitive traffic within a subframe to be processed at a receiver without an FEC check, and therefore without any additional delay due to interleaving. Thus, byte-wise interleaving over a subframe, performed as part of the BLP protocol at the PHY layer, does not destructively interfere with any upper layer interleaving that has been performed at the application layer. At the transmitter, the two FEC operations are performed in parallel using two FEC coders and thereby avoiding any extra delay in encoding. At the receiver, the two FEC blocks are decoded by passing them sequentially through a single standard FEC decoder. Therefore, the FEC utilized in this broadband link protocol (BLP) is characterized by synchronization with individual subframes and systematic interleaving. Only FEC0 640 and FEC1 650 are interleaved. Therefore, synchronizing forward error correction and interleaving within a 125 microsecond subframe utilizing an integral number of FEC blocks provides jitter-free STM transmission, since it is not necessary to receive more than a single subframe of transmission at a cable modem before interpretation of FEC code and deinterleaving.

Figure 7:
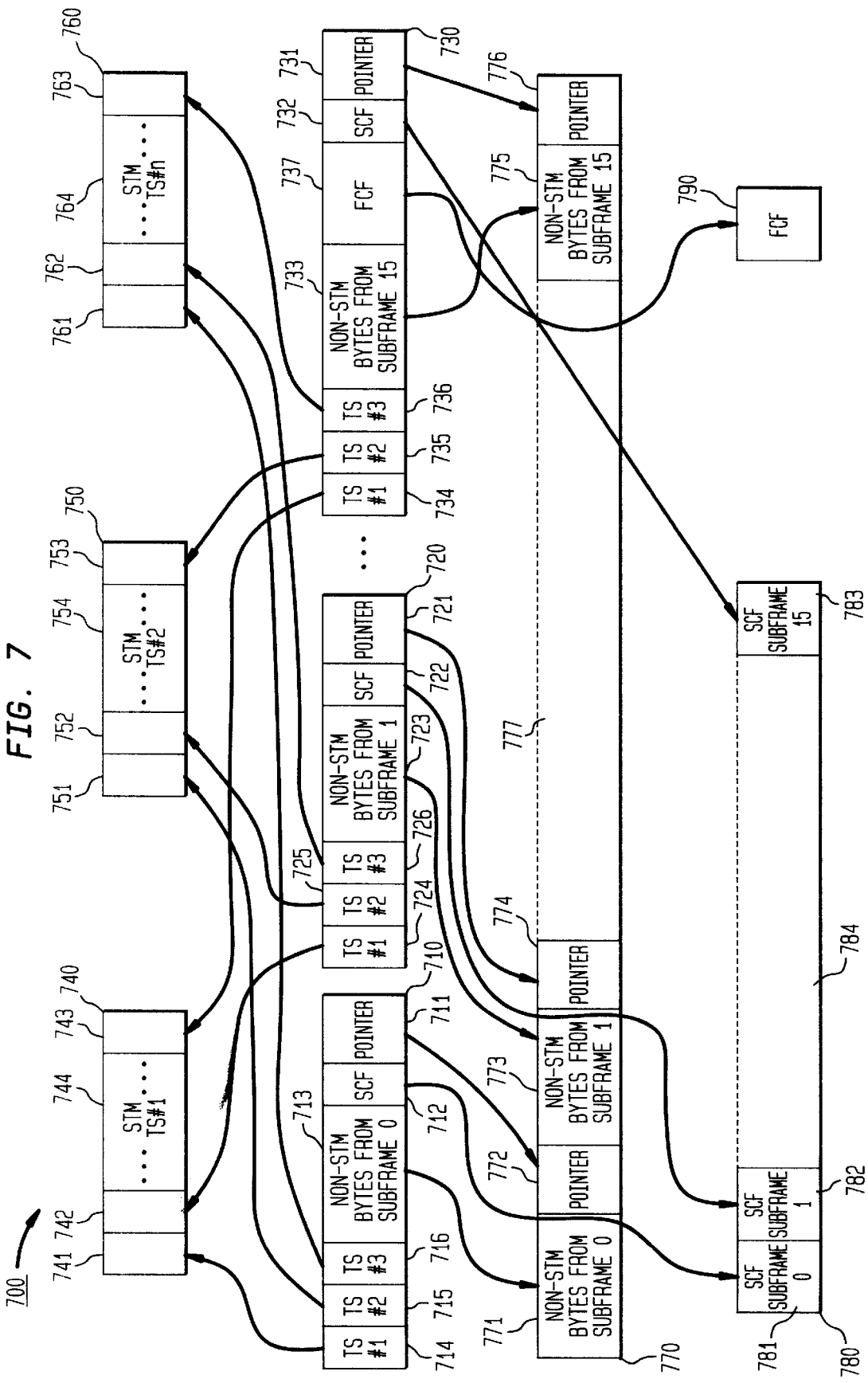
FIG. 7 is a diagram demonstrating an exemplary method of composition and decomposition of transmitted bytes within a typical downstream frame of the present invention.

FIG. 7 illustrates the composition and decomposition of bytes 700 within a typical downstream frame of this broadband link protocol (BLP). Data illustrated in this figure is shown after the framing byte and eight bytes used for forward error correction are removed. Thus, FIG. 7 illustrates only the data payload and how that payload is disseminated. The data payloads from subframe zero 710, subframe one 720, and subframe fifteen 730 only are shown; it being understood that intermediate subframes two through fourteen are similarly composed and decomposed. Also depicted in this figure are STM time slot bytestreams for time slot one 740, time slot two 750, and time slot n 760, n representing the number of synchronous time slots allocated by the bandwidth manager. Asynchronous bytestream 770 concatenates asynchronous data and pointer fields (PF) from the sixteen subframes of a frame. The slow control field bytestream 780 and fast control field 790 are also depicted in FIG. 7.

Subframe zero data payload 710 decomposes in the following manner. Subframe zero time slot one 714 is placed with STM bytestream for time slot one 740 at the first position 741. Subframe zero time slot two 715 is placed with STM bytestream for time slot two 750 at the first position 751. Subframe zero time slot n 716, representing the nth STM channel, is placed with STM bytestream for time slot n 760 at the first position 761. Non-STM bytes from subframe zero 713 are sent to the asynchronous bytestream 770 and held in the left most position 771. Subframe zero slow control field (SCF) 712 is sent to slow control field bytestream 780, at position 781, to be concatenated with the SCFs from other subframes. Finally, the subframe zero pointer field (PF) 711 is transferred from its position within the subframe to be concatenated with the asynchronous bytestream 770 at position 772.

Similarly, subframe one data payload 720 decomposes in the following manner. Subframe one time slot one 724 is placed with STM bytestream for time slot one 740 at the second position 742. Subframe one time slot two 725 is placed with STM bytestream for time slot two 750 at the second position 752. Subframe one time slot n 726 is placed with STM bytestream for time slot n 760 at the second position 762. Non-STM bytes from subframe one 723 are sent to the asynchronous bytestream 770 and held in the left most position available 773. Subframe one SCF 722 is sent to slow control field bytestream 780, at the left most available position 782, to be concatenated with the SCFs from other subframes. Finally, the subframe one PF 711 is transferred from its position within the subframe to be concatenated with the asynchronous bytestream 770 at position 774.

This process is repeated for subframes two through fourteen. Time slot one for subframes two through fourteen are concatenated with STM bytestream for time slot one 744 from left to right. Time slot two for subframes two through fourteen are concatenated with STM bytestream for time slot two 754 from left to right. Time slot n for subframes two through fourteen are concatenated with STM bytestream for time slot n 764 from left to right. Non-STM bytes from subframes two through fourteen and the PF from subframes two through fourteen are alternately sent to asynchronous bytestream 770 and concatenated from left to right in position 777. The SCF from subframes two through fourteen are concatenated in the slow control field bytestream 780 at position 784.

Finally, decomposition of subframe fifteen data payload 730 completes the dissemination of information available from a subframe. Subframe fifteen time slot one 734 is placed with STM bytestream for time slot one 740 at the last available frame position 743. Subframe fifteen time slot two 735 is placed with STM bytestream for time slot two 750 at the last available flame position 753. Subframe fifteen time slot n 736, representing the nth STM channel, is placed with STM bytestream for time slot n 760 at the last available frame position 763. Non-STM bytes from subframe fifteen 733 are sent to the asynchronous bytestream 770 at the right most frame position 775. Subframe fifteen slow control field (SCF) 732 is sent to slow control field bytestream 780, at position 783, to be concatenated with the SCFs from other subframes. Subframe fifteen pointer field (PF) 731 is transferred from its position within the subframe to be concatenated with the asynchronous bytestream 770 at position 776. As mentioned previously, the last subframe in a frame also contains a fast control field (FCF) 737. FCF is utilized to communicate bandwidth allocation information to individual cable modems.

Asynchronous bytestream 770 is concatenated from subframe ATM and VL user information and subframe pointer fields (PFs). User information in each subframe is followed by a corresponding PF. Each PF is two bytes long and separates bytes from adjacent subframes. The PF included with any subframe indicates the number of bytes remaining in the protocol data unit (PDU) transmitted in the previous subframe. In this manner, user information in the form of ATM and VL protocol data units (PDUs) is allowed to cross over subframe, frame, and masterframe boundaries, but still permit the receiver to recover the PDU boundaries. Thus, if an asynchronous PDU is incomplete at the end of a subframe, frame, or masterframe, the PF describes the quantity of information remaining. Allowing a VL PDU to fill the remaining available space near a subframe boundary, despite being unable to be completely transmitted within that subframe, avoids wasting bandwidth.

The pointer field (PF) concurrently conveys the information necessary for identification of the starting point of the PDU in the next subframe, making rapid synchronization and resynchronization to the PDU boundary possible. The PDUs also contain a length field in the PDU headers. The length field defines the PDU boundary. In addition to synchronization using the PF, an asynchronous bytestream is self synchronizing because length fields are included in the PDU header, but this feature will be described in conjunction with another figure.

Figure 8:
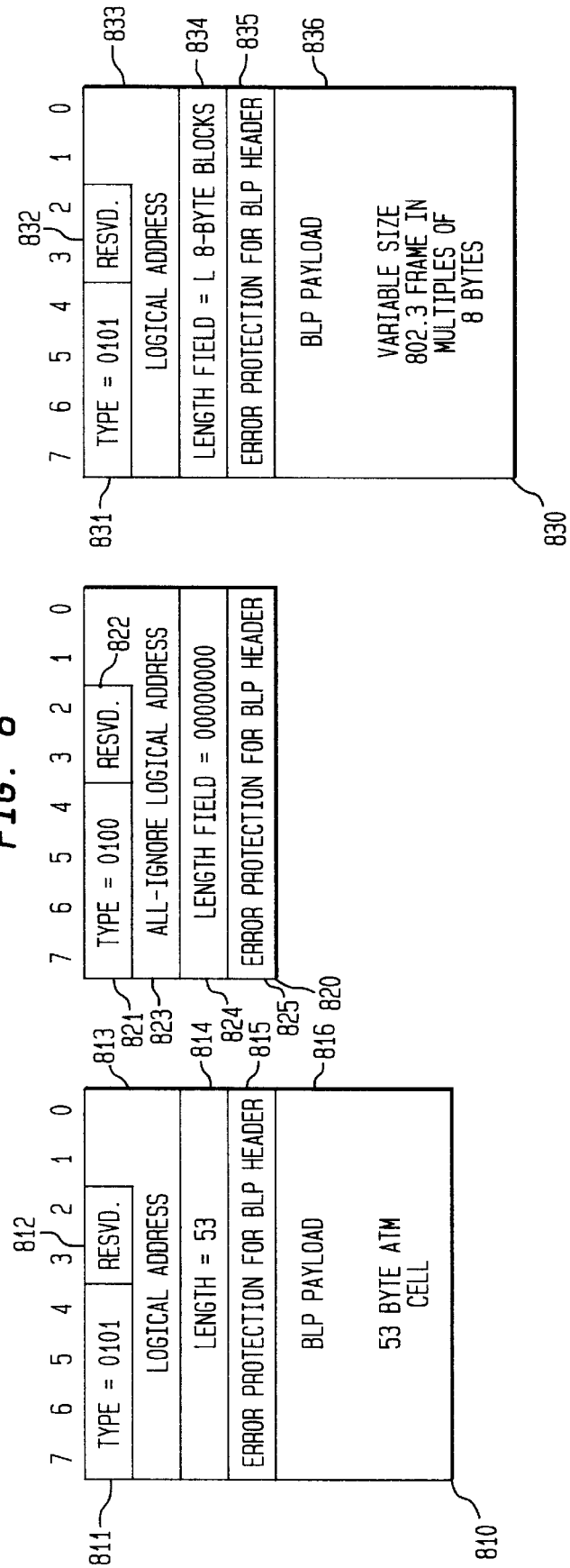
FIG. 8 is an exemplary representation of a downstream broadband link protocol (BLP) format within the user information payload data unit (PDU) of Asynchronous Transfer Mode (ATM) cells, Variable Length frames, and idle cells utilized in accordance with the present invention.

FIG. 8 illustrates the available downstream PDU formats for asynchronous bytestream space. One embodiment of the present invention defines three types of PDU format, although, if desired, other PDU formats may be defined as would be apparent to those skilled in the art. The three defined PDU format types are an ATM format 810, an idle format 820, and a variable length (VL) format 830. The VL format 830 specifically shows an IEEE 802.3 type payload, although other types of variable length payloads, such as IP or IPX, also apply. The BLP attaches a header to each of these formats, the header remaining fixed in size at four bytes regardless of the PDU format type. The header for each PDU format conveys four types of information; four bits describing the type of payload attached to the header, ten bits conveying the logical address of the cable modem for which the PDU is intended, eight bits delineating the length of the payload, and eight bits dedicated to error protection for the BLP header. The eight bits dedicated to error protection for the BLP header is commonly referred to as Header Error Protection (HEC).

The type designation for an ATM cell PDU 811 is '0101', which identifies the BLP payload to the cable modem (CM) as an ATM cell. Two bits of header space is reserved 812 for future use, which may include additional PDU format definitions. A ten bit logical address 813 is included. An eight bit header length field 814 is provided, which is redundant since the PDU format is already distinctly identified by the type designation 811 as an ATM PDU, ATM cells always being fifty-three bytes in length. The ATM PDU also contains eight bits dedicated to BLP header error protection 815. Attached to the four byte header as part of the BLP PDU is the fifty-three byte ATM cell 816, making the total length of an BLP PDU with ATM cell payload 57 bytes.

The type designation for a variable length frame PDU 831 is '0110', which identifies the BLP payload to the CM as a variable length payload. Again, two bits of header space is reserved 832 for future use, which may include additional PDU format definitions. A ten bit logical address 833 is included, which identifies the correct cable modem address for the PDU. The eight bit header length field 834 conveys to the CM size of the VL payload. The length field defines VL size in 8 byte block increments and since the length field itself is 8 bits in length, can describe VL payload lengths up to 2040 bytes. The VL PDU also contains eight bits dedicated to BLP header error protection 835. Attached to the four byte header as part of the BLP PDU is the variable length frame 836.

Finally, in order to account for downstream transmission time when the headend has no user information to transmit, an idle PDU header 820 is sent. An idle PDU 821 is defined by the four bit number '0100'. Again, two bits of header space is reserved 822 for future use. A ten bit logical address 823 is included, which is a unique number which all cable modems recognize as an "all ignore logical address." The eight bit header length field 824 conveys zero payload length to the CMs. The idle PDU header 820 also contains eight bits dedicated to BLP header error protection 825.

Figure 9:
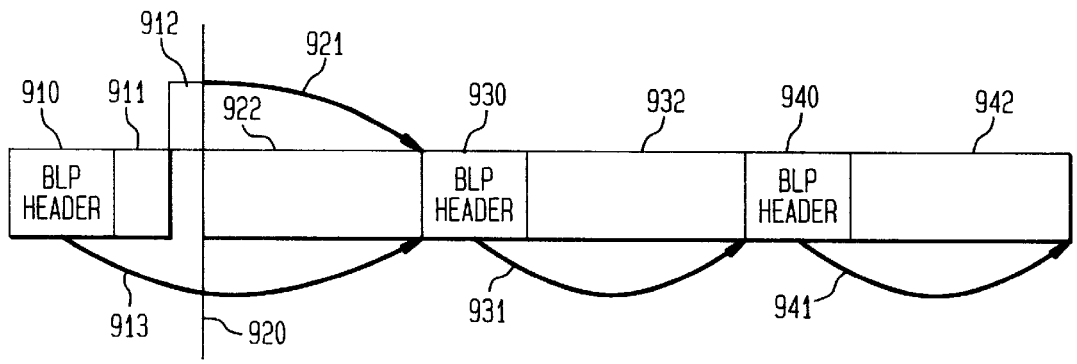
FIG. 9 is an exemplary illustration of protocol data unit demarcation within a broadband link protocol (BLP) frame as utilized in connection with the present invention.

FIG. 9 is an exemplary illustration of the means by which length information contained within a downstream BLP header, combined with a subframe pointer field, mark the ending of individual PDUs, even if they cross subframe, frame, and masterframe boundaries. The BLP header 910 supplies total length information about its associated PDU payload 911 which contains user information. The total length in this illustrative example is shown to transcend the subframe boundary 920 and the remainder of PDU payload 911 is transmitted in the subsequent subframe as PDU payload 922. Length arrow 913 describes the PDU payload total length and points to the beginning of the next PDU header. Pointer field 912 provides information regarding the remaining length 922 of the current PDU payload as it transcends the subframe boundary 920, and therefore points 921 to the beginning of the next PDU header as well. PF is particularly usefull when one or more PDUs are discarded due to errors in transmission. When a PDU is discarded due to transmission errors, the receiver without the aid of a PF cannot easily identify the PDU boundary. However, including a PF allows for PDU boundary identification at the next transmitted subframe.

A new PDU header 930 provides length information about the next PDU payload 932 by pointing 931 to the beginning of the next BLP header. Similarly, the following PDU Header 940 provides length information about the next sequential PDU payload by pointing 941 to the beginning of the next sequential PDU header. In this manner, the beginning of each PDU payload can be properly identified and processed.

Figure 10:
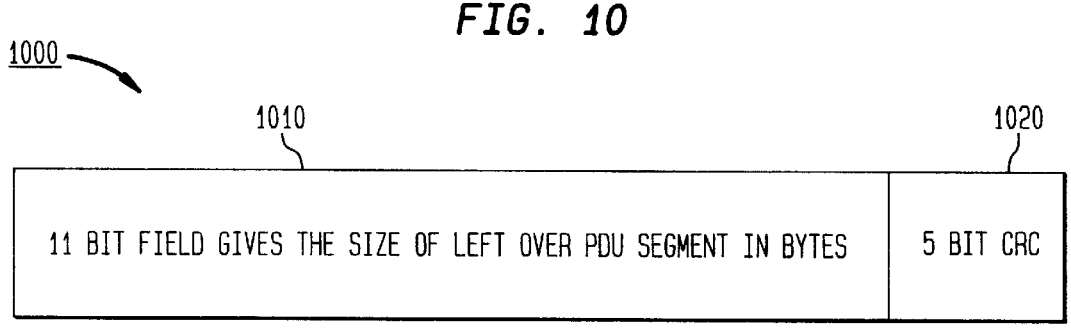
FIG. 10 is an exemplary diagram, illustrating bit assignment within the pointer field as utilized in accordance with the present invention.

FIG. 10 is a representation of the two byte pointer field (PF) 1000. The bits of the PF are divided into two distinct fields. First, a field of eleven bits 1010 are dedicated to conveying information about the remaining length for the current PDU payload. If the transmission of a PDU payload and its associated header had begun in the previous subframe was not completely transmitted within that subframe, then the PF points to the end of the PDU payload in the current subframe. If the remainder of the PDU payload completely occupies the current subframe as well, then the PF value points to the next PF, which is at the end of the next subframe. Second, the remaining five bit field 1020 provides a cyclic redundancy code (CRC) for the PF.

Having fully described downstream communications, it is now time to specify the upstream frame and PDU structures. First, synchronous transfer mode (STM) traffic from voice or video telephony requires strict control of jitter. Because of this requirement, a downstream communication subframe of 125 microseconds was chosen. Sixteen subframes were designated to comprise a downstream frame. A suitable frame structure is also required for the upstream direction. High upstream physical (PHY) layer overhead suggest transmitting upstream STM in larger single bursts from the cable modem (CM). Therefore, one embodiment of the present invention utilizes a two millisecond frame structure to match the downstream frame structure and allow for upstream frame synchronization. Like the downstream frame structure, four upstream frames are incorporated into one upstream masterframe. However, unlike the downstream frame, the upstream frame is not comprised of subframes. This combination of upstream frames and masterframes provides a balance between low PHY layer overhead and low packetization delay for STM communications.

For the remainder of the description of this embodiment of the present invention, upstream channel bandwidth is chosen at 1.8 MHz in the 5–42 MHz range and upstream symbol transmission rate is chosen to be 1.28 megasymbols per second (Msym/s). The method of upstream modulation elected is quaternary phase shift keying (QPSK) at 2 bits per symbol. These elections result in a raw bit transfer rate of 2.56 million bits per second (Mbps). Various modifications can be made to the present invention, as would be apparent to those skilled in the art, including but not limited to specific values corresponding to masterframe and frame timing and construct, type of modulation and demodulation employed, and bandwidth allocated to upstream channels. Accordingly, the specific length of masterframes and frames, as well as the quantity of each are dependent on the elections made, and will necessarily change if different bandwidths or modes of modulation are chosen.

Figure 11:
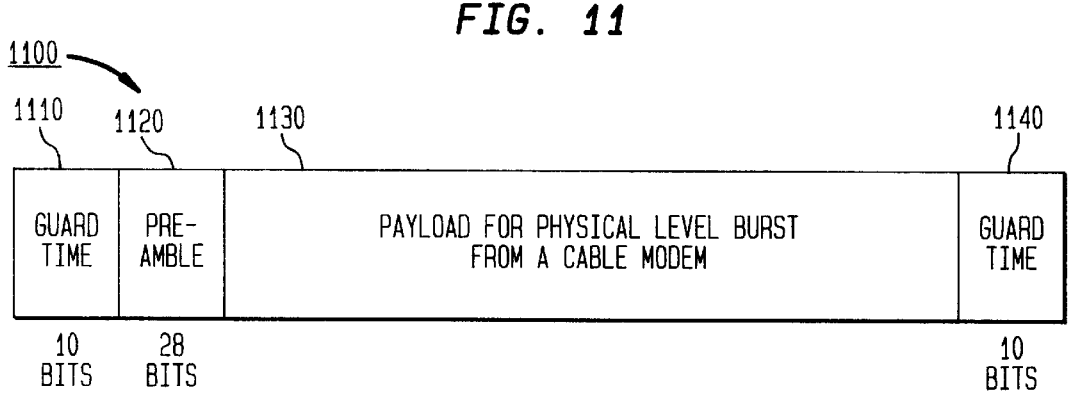
FIG. 11 is an exemplary illustration an upstream burst from a cable modem as utilized in accordance with the present invention.

FIG. 11 illustrates the typical frame structure 1100 for a broadband link protocol (BLP) upstream burst. Transmission front guard time 1110 and transmission end guard time 1140 are each ten bits long, and the preamble 1120 is twenty-eight bits in length. Guard time is provided to overcome inaccuracies encountered with CM ranging and synchronization with the headend (HE). The preamble is a fixed bit pattern used to indicate the commencement of data within the burst.

Figure 12:
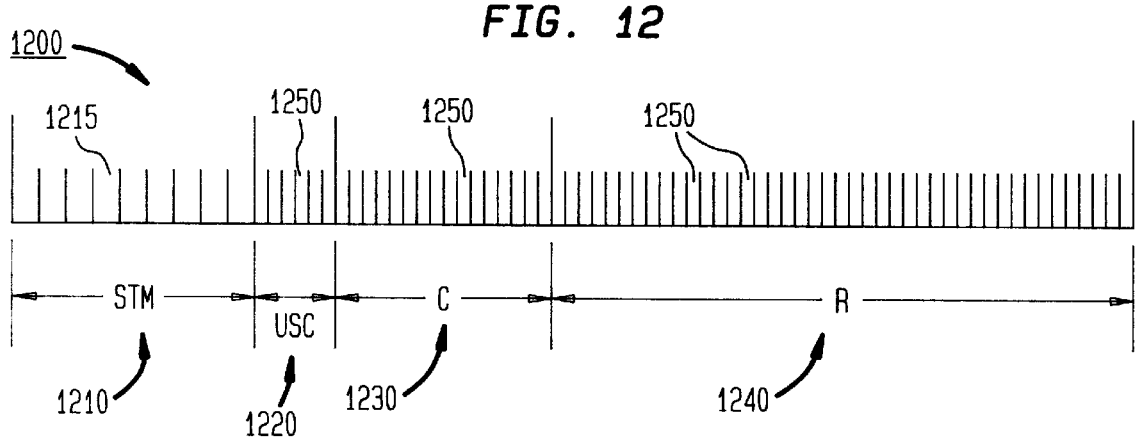
FIG. 12 illustrates an exemplary representation of the regions, fields, and slot structure of an upstream frame from a cable modem in accordance with the present invention.

FIG. 12 illustrates an upstream transmission frame 1200 and slot structure. As previously stated, an upstream frame is two milliseconds long and synchronized with transmitted downstream frames. At 2.56 Mbps, there are a total of 640 bytes available within one frame structure. Four frames comprise a masterframe, which is a total of eight milliseconds long and contains 2560 bytes of information. The masterframe is synchronized with a corresponding downstream masterframe. The frame structure 1200 consists of four distinct regions; an STM region for synchronous voice or video telephony communication, an upstream slow control (USC) region 1220, a contention region (C) 1230, and a reserved region (R) 1240.

The STM region 1210 consists of individual DS0 STM time slots 1215, each twenty-seven bytes long. One STM time slot 1215 is dedicated to each upstream DS0 connection. Providing an STM time slot within each upstream frame allows sixteen bytes of STM information to be transmitted each two milliseconds, thereby facilitating low delay transmission of the STM communications.

The upstream slow control region 1220, contention region 1230, and reserved region 1240 collectively comprise the upstream asynchronous transfer region (ATR). The ATR is composed of a multiplicity of basic slots 1250, each slot twelve bytes in size. Accumulating an integral number of number of bytes to form a basic slot provides granularity required for upstream transmission. User data PDU time slots are formed by combining multiple successive basic slots.

The contention region 1230 contains multiple basic slots in each frame. The exact number is variable and is changed by the headend bandwidth manager (BM), depending on loading and collision history. The BM assigns basic slots among the various regions. Contention slots may be assigned contiguously as illustrated in FIG. 12, but is not so restricted. The BM may alternatively split and spread contention slots among any of the basic slots on a per frame basis and communicate the location of those contention slots to the cable modems through the corresponding MAP sent to the modems in the downstream fast control field (FCF). Cable modems use contention slots to request reserved slots in subsequent frames.

The upstream slow control (USC) region 1220 is a configurable area in specified frames in each masterframe. USC is available in anywhere from zero to four frames in each masterframe. The USC region 1220 contains one contention superslot. Being composed of six basic slots, a superslot is seventy-two bytes long. A superslot allows for the transmission of short messages in contention mode without first making a reservation request. Some examples of messages appropriate for incorporation within a contention superslot include STM signaling, ranging, control and response messages. The superslot is particularly useful during cable modem (CM) synchronization when the CM initially powers up. Off-hook and other signaling messages for voice and video telephony may also be transmitted in contention mode using superslots. In the event of message collisions between cable modems transmitting to a basic slot or superslot, a retransmission scheme based on binary exponential backoff is used. In another exemplary embodiment of the present invention, a ternary tree algorithm or an adaptive p-persistence algorithm may be utilized for the retransmission scheme.

The reserved region 1240 is available to cable modems in multiples of the basic slot. The MAP of the fast control field (FCF) provides information on which subsets of basic slots in the reserved region are available to which modems. Asynchronous user data PDUs from a CM with reservations for message transmission utilize this reserved region for conveyance of that information. Typically, ATM PDUs and VL PDUs use the reserved region for upstream transmission. ATM PDUs can be transmitted in six basic slots. The headend BM uses type information to guarantee that all ATM reservations are in blocks of six contiguous slots per frame. A VL PDU (e.g.—802.3 frame) is allocated as many contiguous basic slots as possible.

Figure 13A:
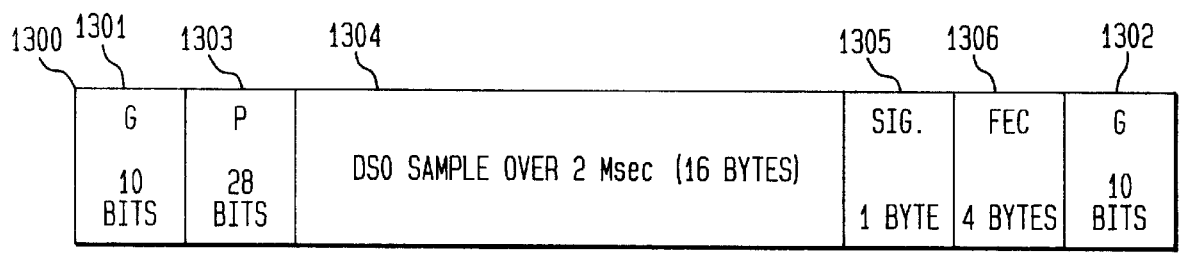
FIG. 13a illustrates an exemplary upstream burst format for synchronous transfer mode (STM) transmission as utilized in accordance with the present invention.

FIG. 13a shows the structure of an STM upstream burst 1300. A ten bit guard band 1301 is included at the beginning of the burst. A twenty-eight bit preamble 1303 is next included. The preamble is a fixed bit pattern utilized to indicate the start of data within the burst. Next included is the sixteen byte STM payload 1304. Less than four kbps bandwidth is required per DS0 connection for signaling. As a result, a one byte signaling field 1305 in the STM PDU is adequate to provide signaling capability for DS0 connections. Four bytes of forward error correction (FEC) 1306 is provided and followed by a burst ending 10 bit guard band. Sixteen bytes of payload every two milliseconds provide a payload data bit transfer rate of 64,000 bps, however, the STM PDU overhead is eleven bytes long and therefore each STM PDU with payload is a total of twenty-seven bytes.

Figure 13B:
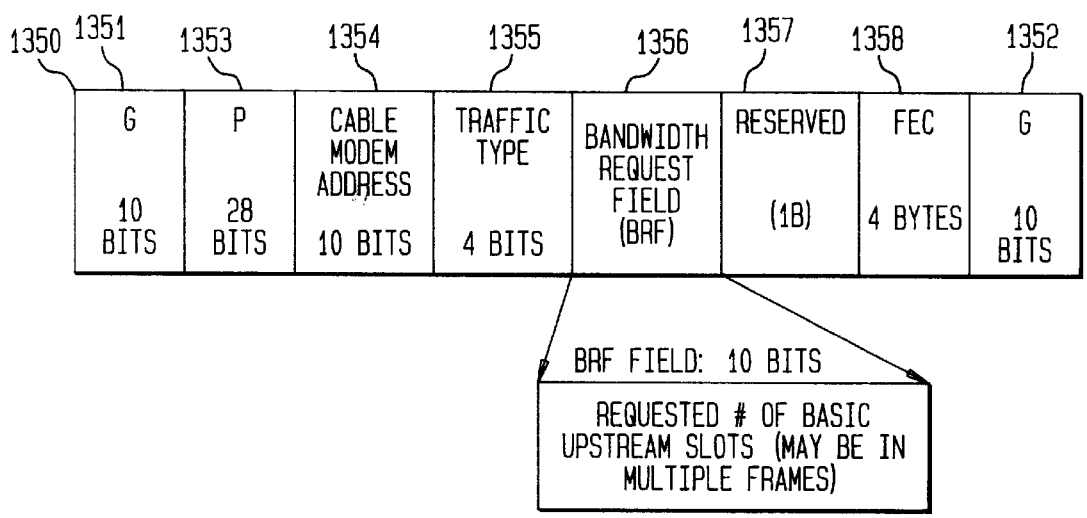
FIG. 13b illustrates an exemplary upstream burst format for a pure contention reservation request transmission as utilized in accordance with the present invention.

FIG. 13b is a diagram of the structure of an upstream burst for pure contention 1350, also known as a reservation request. Included as components of the reservation request are a ten bit guard band at the burst front end 1351 and at the burst tail end 1352, and a twenty-eight bit preamble 1353. The reservation request 1350 also contains a ten bit field identifying the sending cable modem (CM) address 1354 to the headend (HE). A four bit field indicating traffic type 1355 is also included. Four bits allows sixteen distinct types of traffic to be recognized by the HE. The bandwidth request field 1356 is ten bits in length and sixteen bits are dedicated to FEC 1358. Finally, eight bits are reserved for future use 1357.

The bandwidth request field (BRF) 1356 represents a request from a specific cable modem, to the headend BM, for upstream bandwidth allocation in a future upstream frame. The BRF 1356 requests allocation for either a number of ATM, PDUs or the number of basic slots needed for a VL PDU. The request can be made absolutely or incrementally. An absolute request specifies the total number of basic slots or ATM PDUs required for data currently awaiting transmission in a CM buffer. A incremental request is simply a bandwidth request for additional ATM PDUs that have arrived in the CM buffer since the last request.

Because a BRF is transmitted upstream from one of a plurality of cable modems to the headend in the contention region, the possibility of a collision is likely. A collision occurs when more than one cable modem attempts to transmit a BRF in the same basic slot of the same upstream frame. When a collision occurs, neither request is understood by the headend. Therefore, the present invention also includes a contention resolution mechanism to resolve any collisions. If a collision occurs between competing cable modems while transmitting a BRF, each cable modem must retransmit its request in a basic slot in accordance with the contention resolution mechanism. One example of a contention resolution mechanism known in the art is a binary exponential back-off contention resolution mechanism.

Figure 14:
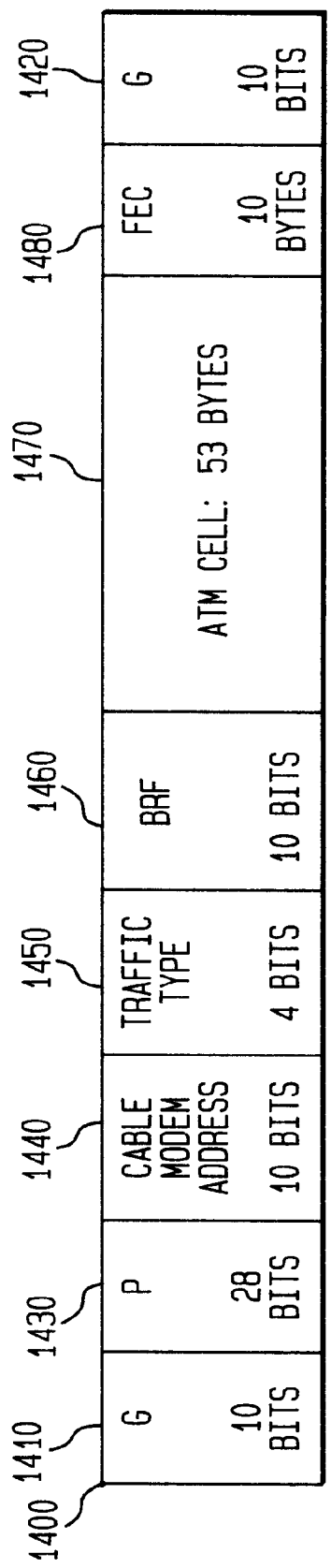
FIG. 14 illustrates an exemplary upstream burst format for an Asynchronous Transfer Mode (ATM) transmission as utilized in accordance with the present invention.

As stated previously, the BRF 1356 is ten bits in length. Nine bits of the BRF are allocated to specify the length of the requested bandwidth, allowing up to 511 ATM cell allocations or up to 511 basic slots (3066 bytes) for VL PDUs. The last bit associated with the BRF specifies whether the request is an absolute request or a relative request FIG. 14 illustrates the structure of an upstream burst for an ATM PDU with ATM cell as payload 1400. The total PHY layer burst length for an ATM burst is seventy-two bytes, fifty-three bytes for the ATM cell 1470, the remaining nineteen bytes for overhead. The headend BM allocates six successive basic slots for each ATM PDU burst, which provides the required seventy-two bytes.

Included as components of the ATM PDU are a ten bit guard band at the burst front end 1410 and at the burst tail end 1420, and a twenty-eight bit preamble 1430. In addition do the ATM cell payload 1470, the ATM PDU 1400 also contains a ten bit field identifying the sending cable modem CM address 1440 to the HE. A four bit traffic type field 1450 identifies the burst to the HE as an ATM PDU with an ATM cell payload. A bandwidth request field (BRF) 1460 is ten bits in length and ten bytes are dedicated to FEC 1480.

The included BRF 1460 is structured exactly the same as described previously in the pure contention mode. In the pure contention mode, the BRF was the payload. The BRF 1460 included in the ATM PDU is a request for bandwidth for the same cable modem (CM) and the same traffic type in subsequent upstream frames. A BRF included within an ATM PDU (or when included in a VL PDU, as will be discussed shortly) is known as a piggyback request. An ATM PDU piggyback request is a request for allocation of upstream bandwidth in subsequent upstream frames, made from the transmitting CM, and requested for the transmission of ATM cell payloads currently held in CM buffer memory. A piggyback request requires no additional overhead, since it is included as part of the ATM PDU, which already possesses the requisite information and overhead. Additionally, since a piggyback request is incorporated within a PDU for which the HE had already reserved bandwidth, the required load or demand for basic slots assigned for contention requests is reduced.

Figure 15:
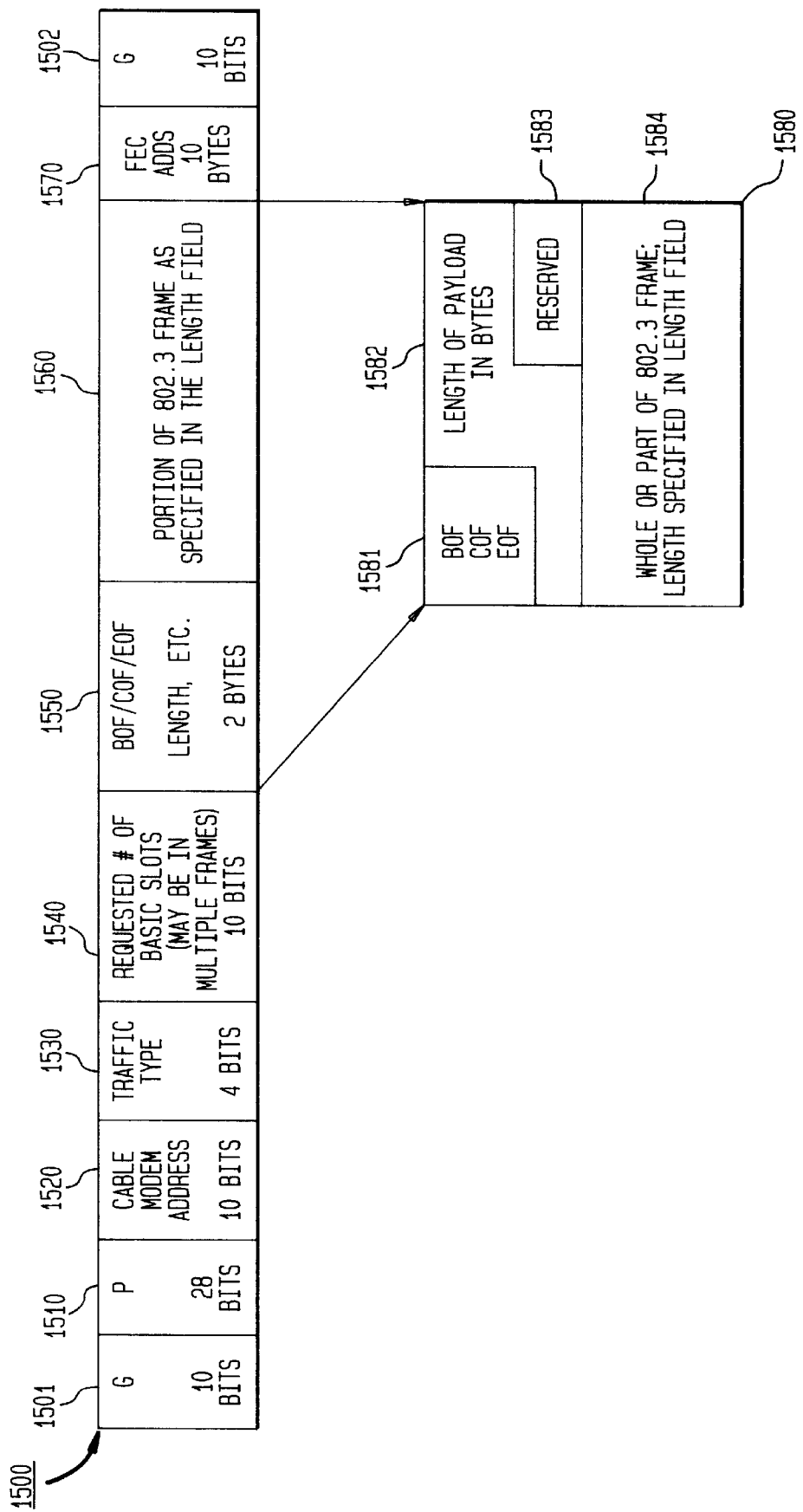
FIG. 15 illustrates an exemplary upstream burst format for a Variable Length (VL) frame transmission as utilized in accordance with the present invention.

FIG. 15 illustrates the structure of an upstream burst for an VL PDU and VL frame payload 1500. Included as components of the VL PDU are a ten bit guard band at the burst front end 1501 and at the burst tail end 1502, and a twenty-eight bit preamble 1510. In addition do the VL frame payload 1560, the VL PDU 1500 also contains a ten bit field identifying the sending cable modem CM address 1520 to the HE. A four bit traffic type field 1530 identifies the burst to the HE as an VL PDU with an VL frame payload. A BRF 1540 is ten bits in length and ten bytes are dedicated to FEC 1570.

The included BRF 1540 is structured exactly the same as described previously regarding an ATM PDU. That is, the BRF 1540 included within the VL PDU 1500 is a piggyback request for additional subsequent bandwidth allocated to the particular CM making the request and for the same VL traffic type. As noted earlier, a piggyback request requires no additional overhead, since it is included as part of the VL PDU 1500, which already possesses the requisite information and overhead. Additionally, since a piggyback request is incorporated within a PDU for which the HE had already reserved bandwidth, the required load or demand for basic slots assigned for contention requests is reduced.

Also included within the VL PDU is a two byte length field 1550. FIG. 15 shows the length field 1550 and the VL frame payload 1584 together 1580. The length field 1550 contains a two bit BOF/COF/EOF subfield 1581, a twelve bit length subfield 1582, and two bits reserved for future use 1583. The length subfield 1582 describes the payload length in bytes. Twelve bits can therefore describe a VL frame size up to 4095 bytes. When basic slots have been reserved for upstream VL payloads, the minimum allocation for VL frames within a frame will be two basic slots, or twenty-four bytes. With larger VL frames, the headend BM allocates as many contiguous blocks of basic slots as possible.

Because VL PDUs vary in size and can extend beyond the boundaries of a frame or masterframe, the BOF/COF/EOF subfield 1581 is used to describe to the headend BM whether the attached burst is the beginning, continuation, or end of an VL frame. If the associated VL flame is too long to completely transmit within the allocated bandwidth of one upstream burst, and the payload to be transmitted is the beginning of a new VL frame, then the BOF/COF/EOF subfield 1581 bits are set to '00' to indicate that this payload is the beginning of an VL frame and that the entire VL frame will not be transmitted in this burst. If a portion of an VL frame has already been transmitted in a previous upstream burst and the remainder of the frame is still too long to completely transmit within the allocated bandwidth of the current upstream burst, then the BOF/COF/EOF subfield 1581 bits are set to '01' to indicate that this payload is a continuation of an VL frame and that the entire VL frame will not be transmitted in this burst. If a portion of an VL frame has already been transmitted in previous upstream bursts and the remainder of the VL frame is capable of being transmitted within the allocated bandwidth of the current upstream burst, then the BOF/COF/EOF subfield 1581 bits are set to '10' to indicate that this payload is a continuation of a VL frame and that the entire VL frame will be transmitted in this burst. Finally, if a portion of a VL frame has not been transmitted in a prior upstream burst, and the VL frame is short enough that the entire VL frame is capable of being transmitted within the allocated bandwidth of the current upstream burst, then the BOF/COF/EOF subfield 1581 bits are set to '11' to indicate that a complete VL frame is being transmitted in one upstream VL PDU payload.

For example, suppose a CM is about to transmit a VL frame containing 400 bytes of payload upstream to the HE. Assuming the headend BM can and has allocated up to 204 bytes (seventeen basic slots) for this communication in each of three successive upstream frames (frames $n_0$, $n_1$, and $n_2$), then the CM transmits 204 bytes of the VL PDU with payload upstream in frame $n_0$. The BOF/COF/EOF field associated with the VL burst in frame $n_0$ is set to '00' to indicate that the beginning, but not a complete VL payload is being transmitted this frame. Since an upstream VL PDU burst contains twenty-one bytes of overhead, only 183 bytes of the VL frame are actually transmitted in frame $n_0$, leaving 217 bytes of the VL frame in the CM buffer to be transmitted in the following upstream frames. In frame $n_1$ the CM transmits the next 204 bytes of the VL PDU with payload upstream in frame $n_1$. The BOF/COF/EOF field associated with the VL burst in frame $n_1$ is set to '01' to indicate that a continuation of the VL frame is being transmitted, but not the remainder of the VL payload. Since an upstream VL PDU burst contains twenty-one bytes of overhead, only the next 183 bytes of the VL frame are actually transmitted in frame $n_1$, leaving thirty-four bytes of the VL frame in the CM buffer to be transmitted in the following upstream frame. Finally, in frame $n_2$, the CM transmits the remaining portion of the VL frame payload. Total required upstream bandwidth is sixty bytes (five basic slots), thirty-four bytes for the remaining VL payload, twenty-one bytes overhead, and five bytes for padding (to round the PDU to an integral number of basic slots). The BOF/COF/EOF field associated with frame $n_2$ is set to '10' to indicate the complete remainder of the VL frame is being transmitted in frame $n_2$.

Having fully described downstream and upstream frame structure and communications, it is appropriate to now revisit the fast control field (FCF) and the MAP field for upstream bandwidth allocation, and describe their function and structure in greater detail. Recall that FIG. 5 is a depiction of the downstream FCF 510 and that an FCF is contained within subframe 15 of each downstream frame. The FCF controls the operation of the BLP physical (PHY) and medium access control (MAC) layers in real time. The FCF maintains a separate forty-two byte MAP for each upstream channel associated with the downstream channel. MAP provides information about the status of upstream contention time slots in the previous frame and reservation of time slots in the next upstream frame.

Figure 16:
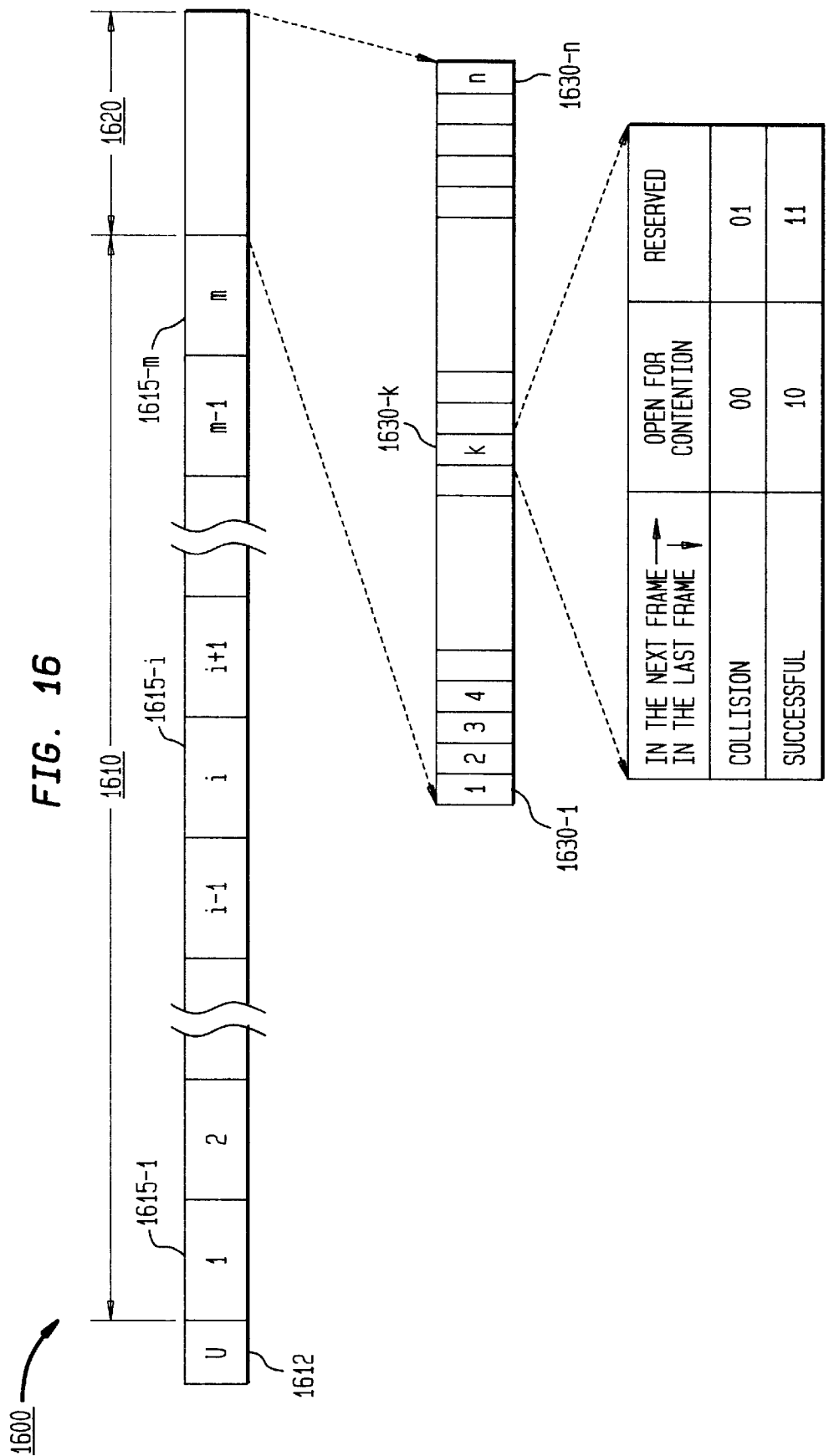
FIG. 16 illustrates an exemplary Fast Control Field (FCF) MAP, focusing on the status map allocating basic slots in the next upstream frame in accordance with the present invention.
Figure 17:
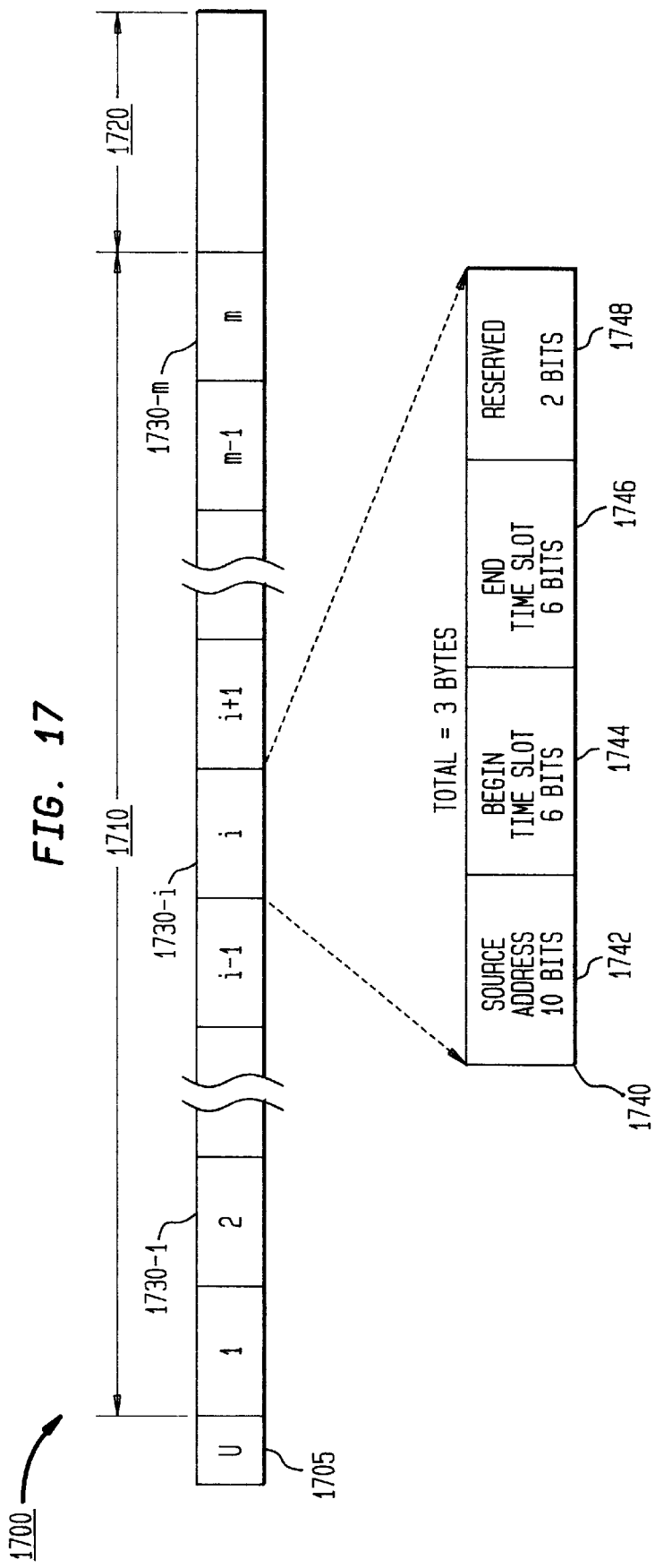
FIG. 17 illustrates an exemplary downstream Fast Control Field (FCF) MAP field, focusing on the upstream bandwidth allocation map for the next upstream frame in accordance with the present invention.

FIG. 16 is a depiction of the structure of a downstream MAP field 1600 with an exploded view of the status map for basic slots 1620. Recall that there is one MAP field 1600 for each upstream channel associated with the downstream channel and that each MAP field is 42 bytes long. MAP is comprised of three major fields; an upstream boundary specification 1612, an upstream bandwidth allocation map for asynchronous communications 1610, and a status map for basic slots 1620.

The upstream boundary specification (U) 1612 conveys to the cable modems the boundary between the synchronous and asynchronous regions within the next upstream frame. U is an eight bit long binary number and specifies the boundary region in units of basic slots. In effect, U specifies the respective sizes for the synchronous and asynchronous regions in an upstream frame.

The upstream bandwidth allocation map for asynchronous communications 1610 contains m subfields 1615-1 to 1615-m. Each subfield 1615 is three bytes in length. Each subfield 1615 is further subdivided in subordinate fields as well. The upstream bandwidth allocation map for asynchronous communications 1610, the subfields 1615, and the subordinate fields will be described in more detail shortly.

The status map for basic slots 1620, maintains a 2 bit status indicator 1630-1 to 1630-n for each basic slot within an upstream frame. The number n represents the maximum number of basic slots in an upstream frame. The status indicator for slot k reports the status of slot k in the previous upstream frame (whether there was a collision or transmission was successful) and reports the allocation of slot k in the next upstream frame (whether slot is open for contention or reserved). The size of the status map for basic slots 1620 is determined by the number of basic slots n. Since upstream frame size is 640 bytes and since each basic slot is twelve bytes long, the maximum number of basic slots within an upstream frame is fifty-three. If n is chosen to be greater than the number basic slots, then each upstream slot is provided with a status map for basic slots. Therefore, we can completely define each upstream slot. Allocating fourteen bytes to the status map for basic slots field 1620 provides a total of 112 bits. Since a status indicator 1630 is two bits in length, there is room for fifty-six status indicators, or n equals fifty-six.

Referring to FIG. 17, again there is an illustration of the structure of a downstream MAP field 1700, but this time with an exploded view of the upstream bandwidth allocation map for asynchronous communications 1710. Although previously examined, but included in this illustration for completeness, are the upstream boundary specification (U) 1705 and the status map for basic slots 1720. The upstream bandwidth allocation map for asynchronous communications 1710 contains m subfields 1730-1 to 1730-m. Each subfield 1730 is three bytes in length and is subdivided into subordinate fields. The source address subordinate field 1742 contains the ten bit address of the CM for which permission is being granted to transmit in the next upstream frame. Also included as subordinate subfields are the six bit begin time slot 1744 and the six bit end time slot 1746. Two bits are unused and designated as reserved 1748.

The source address subordinate field 1742 is used to convey information from the BM to the cable modems about which CM address has been granted permission to transmit in the next upstream frame. In the MAP 1700, the address 1742 is used to identify the CM to which the permission is being given, irrespective of whether the cable modem is transmitting and/or receiving ATM traffic, VL traffic, or both. The specific source address 1742 of all ten bits set to equal '1' is not available as a CM address, it being reserved to indicate that the specified sequence of basic slots together form an upstream superslot for control purposes, such as signaling and ranging (as described earlier in the context of FIG. 12).

As previously noted, there are m subfields 1730 included within the upstream bandwidth allocation map for asynchronous communications field 1710. The value of m must be greater than or equal to the maximum number of possible ATM or VL time slot allocations per frame. Since the upstream frame is composed of 640 bytes, then no more than eight complete ATM PDUs with payload ATM cell may be transmitted upstream in any one frame. Assuming that an ATM PDU with payload is shorter in length than a VL PDU with payload, then setting m equal to nine provides an adequate number of subfields 1730 within the upstream bandwidth allocation map for asynchronous communications field 1710.

Therefore MAP default values of m equal to nine and n equal to 56 are initially established. The values of m and n may be changed if necessary. If new values are desired, the headend will transmit a downstream slow control message to provide information about the new values of m and n.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for transmission of synchronous transfer mode (STM) payloads and asynchronous variable length (VL) payloads over a bi-directional broadband communications network having a source and a destination, said method comprising the steps of:

dividing said transmission into a series of successive time frames;

partitioning each of said time frames into a first region and a second region, said first region and said second region separated with a boundary;

allocating at least one time slot to said first region whenever at least one of said STM payloads is available for said transmission;

dividing said second region into a plurality of basic slots, said plurality of basic slots allocated and assigned for said transmission of said asynchronous VL payloads; and dynamically adjusting the position of said boundary within each of said time frames, to facilitate transmission bandwidth allocation for said source.

2. The method in accordance with claim 1 wherein said plurality of basic slots within said second region are additionally allocated and assigned for transmission of asynchronous transfer mode (ATM) payloads.

3. The method in accordance with claim 1 wherein said transmission is an upstream transmission.

4. The method in accordance with claim 3 wherein said plurality of basic slots within said second region are also allocated and assigned for transmission of asynchronous transfer mode (ATM) payloads.

5. The method in accordance with claim 4 wherein:
said source is a station; and
said destination is a common controller.

6. The method in accordance with claim 5 further comprising the steps of:
subdividing said plurality of basic slots within said second region into an upstream slow control region, a contention region, and a reserved region;
requesting a basic slot allocation within said reserved region of subsequent frames via said contention region; and
transmitting said asynchronous VL payloads and said ATM payloads upstream via said plurality of basic slots within said reserved region.

7. The method in accordance with claim 3 wherein:
said source is a headend; and
said destination is a cable modem.

8. The method in accordance with claim 7 further comprising the steps of:
subdividing said plurality of basic slots within said second region into an upstream slow control region, a contention region, and a reserved region;
requesting a basic slot allocation within said reserved region of subsequent frames via said contention region; and
transmitting said asynchronous VL payloads and said ATM payloads upstream via said plurality of basic slots within said reserved region.

9. The method in accordance with claim 8 wherein said upstream ATM payloads are appended with a bandwidth request field (BRF), said BRF a means of requesting a quantity of additional bandwidth in subsequent upstream frames, said BRF transmitted upstream in said reserved region such that said BRF is not subject to a collision.

10. The method in accordance with claim 8 wherein said upstream VL payloads are appended with a bandwidth request field (BRF), said BRF a means of requesting a quantity of additional bandwidth in subsequent upstream frames; said BRF transmitted upstream in said reserved region and therefore said BRF not subject to a collision.

11. A method for downstream transmission of synchronous transfer mode (STM) payloads and asynchronous variable length (VL) payloads over a bi-directional broadband communications network between a headend and at least one cable modem, said method comprising the steps of:

dividing said downstream transmission into a series of successive downteam time frames;

dividing each of said downstream time frames into an integral number of downstream subframes;

partitioning each of said downstream subframes into a downstream first region and a downstream second region;

allocating at least one time slot to said downstream first region whenever at least one of said STM payloads is to be transmitted; and allocating said asynchronous VL payloads to said downstream second region.

12. The method in accordance with claim 11 further comprising the step of allocating asynchronous transfer mode (ATM) payloads to said downstream second region.

13. The method in accordance with claim 12 wherein an integral number of said successive downstream time frames are transmitted downstream collectively as a master frame.

14. The method in accordance with claim 12 further comprising the steps of:

designating information bytes from each of said downstream subframes into an odd numbered group and an even numbered group;

computing a first forward error correction (FEC) number for said odd numbered group for each of said downstream subframes;

computing a second forward error correction (FEC) number for said even numbered group for each of said downstream subframes;

byte-wise interleaving and appending said first FEC number and said second FEC number to each of said downstream subframes; and transmitting downstream each of said downstream subframes appended with said first FEC number and said second FEC number while preserving the order of said information bytes in each of said downstream subframes.

15. The method in accordance with claim 14 wherein said byte-wise interleaving and appending of said first FEC number and said second FEC number within each of said downstream subframes preserves application layer interleaving and forward error correction, if said application layer interleaving and forward error correction had previously been performed.

16. The method in accordance with claim 14 wherein delay sensitive traffic within each of said downstream subframes is processed at said at least one cable modem without verifying said first FEC number and said second FEC number, thereby incurring no additional delay due to said at least one cable modem deinterleaving and decoding said first FEC number and said second FEC number.

17. The method in accordance with claim 12 further comprising the steps of:

attaching a VL protocol data unit (PDU) header to each of said downstream VL payloads;

attaching an ATM protocol data unit (PDU) header to each of said downstream ATM payloads; and attaching an Idle protocol data unit (PDU) header to transmit downstream without payload, said Idle PDU header utilized whenever neither said VL PDU header or said ATM PDU header are being transmitted downstream;

said VL PDU header, said ATM PDU header, and said Idle PDU header being collectively referred to as packet headers.

18. The method in accordance with claim 17 wherein said packet headers are adapted to:
 a packet header type identification to said cable modem;
 a length quantity describing the length of said VL payload; and
 a cable modem address field.

19. The method in accordance with claim 12 further comprising the steps of:
 creating a fast control field (FCF) for said downstream transmission; and
 transmitting said FCF within said downstream second region of at least one of said downstream subframes for each of said downstream time frames;
 said FCF conveying bandwidth allocation information from said headend to said cable modem.

20. The method in accordance with claim 12 further comprising the steps of:
 creating a slow control field (SCF) for said downstream transmission; and
 transmitting said SCF within said downstream second region of at least one of said downstream subframes for each of said downstream time frames;
 said SCF conveying from said head end to said cable modem a plurality of control messages, each of said plurality of control messages capable of transcending said downstream subframe and said downstream time frame.

21. The method in accordance with claim 11 wherein upstream transmission of said STM payloads and asynchronous VL payloads are also enabled, said method further comprising the steps of:
 dividing said upstream transmission into a series of successive upstream time frames;
 partitioning each of said upstream time frames into an upstream first region and an upstream second region;
 allocating at least one upstream time slot to said upstream first region whenever at least one of said STM payloads is to be transmitted; and
 dividing said upstream second region into a plurality of basic slots, said plurality of basic slots allocated and assigned for said upstream transmission of said asynchronous VL payloads.

22. The method in accordance with claim 21 further comprising the steps of:
 subdividing said plurality of basic slots into an upstream slow control region, a contention region, and a reserved region;
 requesting, via said contention region, a basic slot allocation for upstream transmission within said reserved region of subsequent frames; and
 transmitting said asynchronous VL payloads upstream within said basic slot allocation.

23. The method in accordance with claim 21 wherein said plurality of basic slots within said second region are also allocated and assigned for upstream transmission of asynchronous transfer mode (ATM) payloads.

24. The method in accordance with claim 23 further comprising the step of allocating asynchronous transfer mode (ATM) payloads to said downstream second region for downstream transmission.

25. The method in accordance with claim 24 further comprising the steps of:
 subdividing said plurality of basic slots into an upstream slow control region, a contention region, and a reserved region;
 requesting, via said contention region, a basic slot allocation for upstream transmission within said reserved region of subsequent frames;
 transmitting upstream messages via said upstream slow control region; and
 transmitting upstream said asynchronous VL payloads and said ATM payloads within said basic slot allocation.

26. The method in accordance with claim 25, wherein a request for a basic slot allocation for upstream transmission in said reserved region of subsequent frames is made, further comprising the steps of:
 requesting said basic slot allocation within a bandwidth request field (BRF);
 representing said request for said basic slot allocation as an absolute request whenever said request is an initial request; and
 representing said request for said basic slot allocation as an incremental request whenever said request is a request for additional bandwidth.

27. The method in accordance with claim 26 further comprising the step of appending said BRF with said upstream transmission of said asynchronous VL payloads and said ATM payloads, said BRF thereby also transmitted within said reserved region.

28. A multiservice protocol for a bi-directional broadband communications system operating between a source and at least one destination, said protocol having a downstream structure and an upstream structure, said downstream structure comprising:
 a series of successive downstream frames included within said downstream structure;
 a plurality of downstream subframes, said downstream frames comprised of said downstream subframes;
 a downstream synchronous region included within said downstream subframes when synchronous transfer mode (STM) payloads are to be transmitted;
 at least one downstream STM time slot within said downstream synchronous region when STM payloads are to be transmitted; and
 a downstream asynchronous region within said downstream subframes, said downstream asynchronous region utilized for the downstream transmission of asynchronous variable length (VL) payloads.

29. The multiservice protocol in accordance with claim 28 wherein:
 said source is a common controller; and
 said at least one destination is at least one station.

30. The multiservice protocol in accordance with claim 29 wherein said downstream asynchronous region is further utilized for downstream transmission of asynchronous transfer mode (ATM) payloads.

31. The multiservice protocol in accordance with claim 28 wherein:
 said source is a headend; and
 said at least one destination is at least one cable modem.

32. The multiservice protocol in accordance with claim 31 wherein said downstream asynchronous region is further utilized for downstream transmission of asynchronous transfer mode (ATM) payloads.

33. The multiservice protocol in accordance with claim 32 further comprising:
a downstream fast control field (FCF), said FCF transmitting bandwidth allocation information to said at least one cable modem, said bandwidth allocation information utilized to configure subsequent said upstream structure from said at least one cable modem to said headend; and
a downstream slow control field (SCF), said SCF transmitting at least one control message to said at least one cable modem, said at least one control message unrestricted by downstream frame and downstream subframe boundaries.

34. The multiservice protocol in accordance with claim 33 wherein:
said downstream FCF is transmitted within said downstream asynchronous region in at least one said downstream subframe per said downstream frame; and
said downstream SCF is transmitted in each said downstream subframe.

35. The multiservice protocol in accordance with claim 31, said upstream structure comprising:
a series of successive upstream frames included within said upstream structure;
a first upstream region within each of said upstream frames;
a second upstream region within each of said upstream frames;
at least one time slot allocated within said first upstream region whenever at least one of said STM payloads is to be transmitted; and
a plurality of basic slots, said plurality of basic slots apportioned throughout the entirety of said second upstream region, said plurality of basic slots allocated and assigned for transmitting upstream said asynchronous VL payloads.

36. The multiservice protocol in accordance with claim 35 wherein said second upstream region is flier utilized for upstream transmission of asynchronous transfer mode (ATM) payloads.

37. A bi-directional broadband communications system having a transmission network wherein at least one cable modem is interconnected with a headend via a transmission medium having a multiple access upstream channel and a broadcast downstream channel, said system capable of transporting synchronous transfer mode (STM) payloads and asynchronous variable length (VL) payloads, comprising:
a cable modem framer for dividing said upstream transmission into a series of successive upstream time frames; and
a headend bandwidth manager transmitting downstream a boundary location for each of said upstream time frames, said boundary location partitioning said frames into a first region and a second region;
said headend bandwidth manager allocating to said first region at least one time slot whenever said cable modem has at least one said STM payload for said upstream transmission;
said cable modem dividing said second region into a plurality of basic slots, said basic slots allocated and assigned for said upstream transmission of said VL payloads; and
said headend bandwidth manager dynamically adjusting said boundary location within said successive upstream time frames to facilitate desired bandwidth allocation for said cable modem.

38. The bi-directional broadband communications system in accordance with claim 37 wherein said plurality of basic slots are also allocated and assigned for said upstream transmission of asynchronous transfer mode (ATM) payloads.

39. A method for upstream transmission of synchronous transfer mode (STM) payloads and asynchronous variable length (VL) payloads over a bi-directional broadband communications network having a headend and at least one cable modem, said method comprising the steps of:
dividing said upstream transmission into a series of successive time frames;
partitioning said time frames into a first region and a second region, said first region and said second region separated with a boundary;
allocating at least one fixed length time slot to said first region whenever said cable modem has at least one said STM payload for said upstream transmission;
dividing said second region into a plurality of basic slots, said basic slots allocated and assigned for said upstream transmission of said VL payloads; and
dynamically adjusting said boundary position within said frames as determined by said headend, to facilitate a bandwidth allocation for said cable modem.

40. The method in accordance with claim 39 wherein the length of each of said plurality of basic slots provides bandwidth granularity in conformance with transmission quality of service requirements.

41. The method defined in claim 39 further comprising the steps of:
subdividing said basic slots of said second region into an upstream slow control region, a contention region, and a reserved region;
requesting said basic slot allocation in said reserved region in subsequent frames via said contention region; and
transmitting said asynchronous VL payloads upstream via basic slots in said reserved region.

42. A method for upstream transmission and downstream transmission of synchronous transfer mode (STM) payloads, asynchronous transfer mode (ATM) payloads, and asynchronous variable length (VL) payloads over a bi-directional broadband communications network having a headend and at least one cable modem, said method comprising the steps of:
dividing said upstream transmission into a series of successive upstream time frames;
partitioning each of said upstream time frames into an upstream first region and an upstream second region;
dividing said downstream transmission into a series of successive downstream time frames;
dividing said downstream time frames into a plurality of successive downstream time subframes;
partitioning each of said plurality of downstream time subframes into a downstream first region and a downstream second region;
allocating at least one time slot each to said upstream first region and downstream first region, whenever at least one of said STM payloads is to be transmitted; and
assigning a portion of said upstream second region and said downstream second region for conveyance of said asynchronous VL payloads and said ATM payloads.

43. The method in accordance with claim 42 wherein a length of each of said plurality of successive downstream time subframes is selected to minimize delay of said STM payloads.

44. The method in accordance with claim 43 wherein said length of each of said plurality of successive downstream time subframes is 125 microseconds.

45. The method in accordance with claim 42 further comprising the steps of:

queuing a VL PDU at a transmitter for eventual transmission to a receiver;

appending a packet header to said VL PDU; and including a length field within said packet header;

said length field including a variable, said variable conveying length information of said VL PDU to said at least one cable modem.

46. The method in accordance with claim 45 further comprising the step of including a second variable within the length field;

said second variable equal to a first value if said VL PDU is transmitted completely within one subframe;

said second variable equal to a second value if said VL PDU transmission is started in a previous subframe, but completed within a current subframe;

said second variable equal to a third value if said VL PDU transmission is started within said current subframe, but to be completed in a subsequent subframe; and said second variable equal to a fourth value if said VL PDU transmission is continued within said current subframe, but to be completed in a subsequent subframe.

47. The method in accordance with claim 42 further comprising the step of including within said downstream transmission a fast control field (FCF), said FCF providing said at least one cable modem with a location for said partitioning each of said upstream time frames into said upstream first region and said upstream second region.

48. The method in accordance with claim 47 wherein said first region is allocated for transmission of said STM payloads.

49. The method in accordance with claim 47 wherein said second region is allocated for transmission of said ATM payloads and said VL payloads.

50. The method in accordance with claim 49 wherein said second region is further allocated for transmission of at least one upstream slow control (USC) message within a USC superslot;

said USC superslot comprised of a plurality of basic slots;

said USC superslot operable for upstream transmission of said at least one USC message; and said at least one USC message transmitted without reservation and said USC message subject to contention.

51. The method in accordance with claim 47 wherein said FCF contains a downstream MAP, said downstream MAP utilized to provide said at least one cable modem upstream transmission status and upstream reservation grant information at preselected intervals.

52. The method in accordance with claim 42 further comprising the steps of:

incorporating a pointer field (PF) within each of said downstream time subframes;

allocating within each PF a first number of bits, said first number of bits utilized for a cyclical redundancy check (CRC); and allocating within each PF a second number of bits, said second number of bits utilized to convey the quantity of incomplete variable length transmission within each of said downstream time subframes.

53. A method for transmission of synchronous transfer mode (STM) payloads and asynchronous variable length (VL) payloads, said method comprising the steps of:

dividing said transmission into a series of successive time frames;

partitioning each of said time frames into a first region and a second region, said first region and said region separated with a boundary;

allocating at least one time slot to said first region whenever at least one of said STM payloads is available for said transmission;

dividing said second region into a plurality of basic slots, said plurality of basic slots allocating and assigned for said transmission of said asynchronous VL payloads; and dynamically adjusting the position of said boundary within each of said time frames, to facilitate transmission bandwith allocation for said source.

\* \* \* \* \*